US012536627B2

(12) United States Patent
Powell

(10) Patent No.: US 12,536,627 B2
(45) Date of Patent: Jan. 27, 2026

(54) DISTORTION CORRECTION VIA ANALYTICAL PROJECTION

(71) Applicant: Microsoft Technology Licensing, LLC, Redmond, WA (US)

(72) Inventor: Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 17/951,430

(22) Filed: Sep. 23, 2022

(65) Prior Publication Data

US 2024/0112315 A1 Apr. 4, 2024

(51) Int. Cl.
*G06T 5/80* (2024.01)

(52) U.S. Cl.
CPC ...................... *G06T 5/80* (2024.01)

(58) Field of Classification Search
CPC ........... G06T 5/80; G06T 3/12; H04N 23/698; H04N 13/111; H04N 25/60; H04N 25/61; H04N 25/671; G02B 2027/011
See application file for complete search history.

(56) References Cited

U.S. PATENT DOCUMENTS

| | | | |
|---|---|---|---|
| 9,635,255 B1 | 4/2017 | Baldwin | |
| 10,120,267 B2 | 11/2018 | Bonnier et al. | |
| 10,430,972 B2 * | 10/2019 | Dahlström | ................ G06T 7/80 |
| 11,587,528 B2 | 2/2023 | Sommerlade et al. | |
| 2007/0263080 A1 * | 11/2007 | Harrell | ...................... H04N 7/15 |
| | | | 348/E7.083 |
| 2009/0295835 A1 * | 12/2009 | Husoy | ...................... H04N 7/15 |
| | | | 345/660 |
| 2009/0322889 A1 | 12/2009 | Kujawa et al. | |
| 2014/0104424 A1 * | 4/2014 | Zhang | ..................... G06T 3/047 |
| | | | 348/148 |
| 2016/0225301 A1 | 8/2016 | Scepanovic et al. | |
| 2018/0041696 A1 | 2/2018 | Balasubramanian | |
| 2018/0276792 A1 * | 9/2018 | Stepanenko | ......... H04N 23/698 |

(Continued)

FOREIGN PATENT DOCUMENTS

| | | |
|---|---|---|
| CN | 107909640 A | 4/2018 |
| DE | 102020209379 A1 | 1/2022 |

OTHER PUBLICATIONS

Ekpar et al., "On the Interactive Visualization of Very Large Image Data Sets," Proceedings of 7th International Conference on Computer and Information Technology, Oct. 16, 2007, pp. 627-632.

(Continued)

*Primary Examiner* — Jared Walker

(57) ABSTRACT

A method for processing a stream of input images is provided. The method includes receiving a stream of input images, and applying a digital effect to the stream of input images. The digital effect is one or more from the group of: a pan, a tilt, or a zoom, of the stream of input images. The method further includes selecting an analytical projection type, from a plurality of analytical projection types, that maps pixels of the input stream of images to projected pixels of a modified stream of images, generating the modified stream of images, using the selected analytical projection type, thereby correcting a geometric distortion within the stream of input images, while applying the digital effect, and displaying the modified stream of images.

20 Claims, 13 Drawing Sheets

(56) References Cited

U.S. PATENT DOCUMENTS

| | | | |
|---|---|---|---|
| 2019/0139188 A1* | 5/2019 | Newman | G06T 3/00 |
| 2019/0188454 A1 | 6/2019 | Yuan et al. | |
| 2020/0092453 A1 | 3/2020 | Gordon et al. | |
| 2021/0118404 A1 | 4/2021 | Bartscherer et al. | |
| 2022/0070385 A1* | 3/2022 | Van Os | H04N 23/63 |
| 2022/0159166 A1 | 5/2022 | Files et al. | |
| 2022/0262326 A1 | 8/2022 | Sommerlade et al. | |
| 2022/0414819 A1* | 12/2022 | Rappaport | H04N 23/611 |
| 2023/0126495 A1 | 4/2023 | Sommerlade et al. | |

OTHER PUBLICATIONS

International Search Report and Written Opinion received for PCT Application No. PCT/US2023/027957, Nov. 3, 2023, 19 pages.
Notice of Allowance mailed on Dec. 8, 2023, U.S. Appl. No. 18/085,351, 14 pages.
"Non Final Office Action Issued in U.S. Appl. No. 17/174,478", Mailed Date: Feb. 17, 2022, 14 Pages.
"International Search Report and Written Opinion Issued in PCT Application No. PCT/US22/013090", Mailed Date: Apr. 25, 2022, 12 Pages.
Notice of Allowance mailed on Apr. 1, 2024, in U.S. Appl. No. 18/085,351, 16 pages.
"Notice of Allowance Issued in U.S. Appl. No. 17/174,478", Mailed Date: Sep. 21, 2022, 5 Pages.
"Non Final Office Action Issued in U.S. Appl. No. 18/085,351", Mailed Date: Jul. 7, 2023, 9 Pages.
International Preliminary Report on Patentability received for PCT Application No. PCT/US23/027957, Apr. 3, 2025, 12 pages.

* cited by examiner

DISTORTION CORRECTION VIA ANALYTICAL PROJECTION

BACKGROUND

Cameras are used for communication in a plurality of different contexts. For examples, cameras are commonly used in conference rooms to allow video image data of meetings to be sent to remote locations for others to participate in the meeting. In this manner, people at remote locations can enjoy a more collaborate experience than with audio alone. However, some lenses of cameras create geometric distortion of objects (e.g., tables, people, walls, etc.) that are not life-like (e.g., when applying digital effects, such as pan, tilt, and/or zoom), thereby creating displays of video image data that are not life-like.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for processing a stream of input images. Some aspects relate to computing devices that are capable of receiving a stream of wide-angle input images, applying a digital effect to the stream of wide-angle input images, determining an analytical projection type, and applying the analytical project type to the stream of input images, to generate a modified stream of input images. Accordingly, using mechanisms described herein, a geometric distortion within the stream of input images is corrected, in the modified stream of input images, while applying the digital effect.

In some examples, a method for processing a stream of input images is provided. The method includes receiving a stream of input images, and applying a digital effect to the stream of input images. The digital effect is one or more from the group of: a pan, a tilt, or a zoom, of the stream of input images. The method further includes selecting an analytical projection type, from a plurality of analytical projection types, that maps pixels of the input stream of images to projected pixels of a modified stream of images, generating the modified stream of images, using the selected analytical projection type, thereby correcting a geometric distortion within the stream of input images, while applying the digital effect, and displaying the modified stream of images.

In some examples, the digital effect is a first digital effect, the analytical projection type is a first analytical projection type, and the method further includes: applying a second digital effect, selecting a second analytical projection type, from the plurality of analytical projection types, in real-time, based on the second digital effect, and updating the displayed modified stream of images, based on the second analytical projection type.

In some examples, a system for processing a stream of input images is provided. The system includes an image sensor, a lens associated with the image sensor, at least one processor, and memory storing instructions that, when executed by the at least one processor, cause the system to perform a set of operations. The lens has a lens distortion. Further, the set of operations includes: obtaining, from the image sensor, a stream of input images, applying a digital effect to the stream of input images, and selecting an analytical projection type that maps pixels of the input stream of images to projected pixels of a modified stream of image. The analytical projection type is based, at least in part, on the lens distortion. The set of operations further includes: applying the analytical projection type to the stream of input images, to generate the modified stream of images, thereby correcting a geometric distortion within the stream of input images, while applying the digital effect, and outputting the modified stream of images.

In some examples, a method for processing a stream of input images is provided. The method includes receiving a stream of input images, applying a digital effect to the stream of input images, selecting an analytical projection type, from a plurality of analytical projection types, that maps pixels of the input stream of images to projected pixels of a modified stream of images, and applying the analytical projection type to the stream of input images, to generate the modified stream of images, thereby correcting a geometric distortion within the stream of input images, in the modified stream of images, while applying the digital effect. The method further includes displaying the modified stream of images, applying a second digital effect, selecting a second analytical projection type, from the plurality of analytical projection types, in real-time, based on the second digital effect, and updating the displayed modified stream of images, based on the second analytical projection type.

In some examples, the second digital effect is applied to the modified stream of images.

In some example, the second digital effect is applied to the stream of input images In some examples, the stream of input images is received from an image sensor, and a lens associated with the image sensor has a horizontal field of that that is greater than 120 degrees.

In some examples, the lens associated with capturing the stream of input images has a lens distortion, and the analytical projection type is based, at least in part, on the lens distortion.

In some examples, the plurality of analytical projection types includes a rectilinearly symmetric projection.

In some examples, the plurality of analytical projection types includes a plurality of discrete meshes, each of the plurality of discrete meshes being configured to correct, to varying degrees, the geometric distortion within the stream of input images.

In some examples, applying the digital effect includes applying a plurality of analytical functions to a grid that maps ($x_0$, $y_0$, $z_0$) to ($x_0'$, $y_0'$, $z_0'$), wherein ($x_0$, $y_0$, $z_0$) corresponds to a pixel position in the stream of input images, and ($x_0'$, $y_0'$, $z_0'$) corresponds to a pixel position in the modified stream of images.

In some examples, the plurality of analytical functions are based on a first angle ($\varphi$), a second angle ($\Theta$), and a third angle ($\varphi_{cam}$). The first, second, and third angles each corresponding to the digital effect on which the modified stream of images is based.

In some examples, $\varphi$ and $\Theta$ are each non-zero angles.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
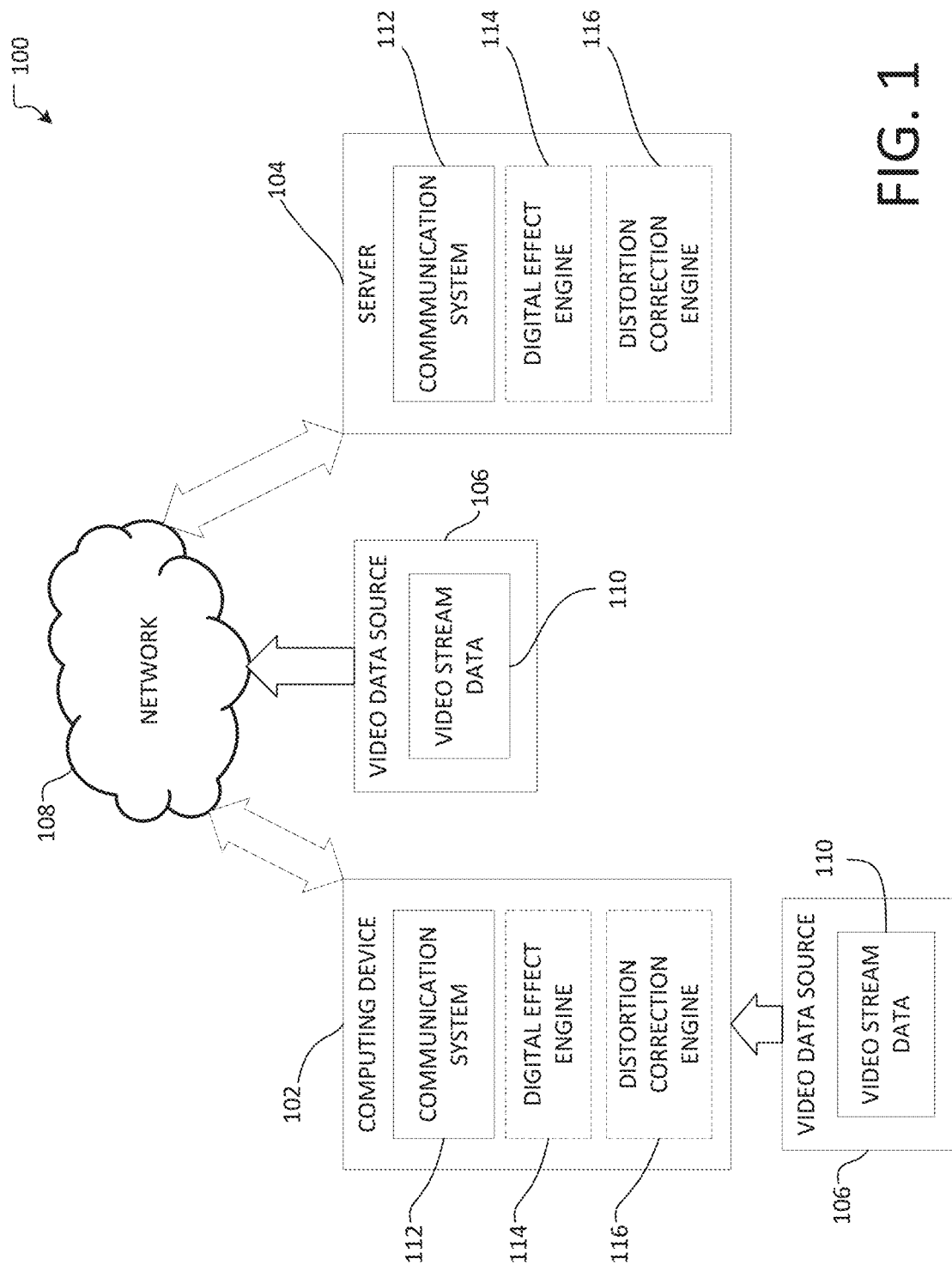
FIG. 1 illustrates an overview of an example system according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, cameras are used for communication in a plurality of different contexts. For examples, cameras are commonly used in conference rooms to allow video image data of meetings to be sent to remote locations for others to participate in the meeting. In this manner, people at remote locations can enjoy a more collaborate experience than with audio alone. However, some lenses of cameras create geometric distortion of objects (e.g., tables, people, walls, etc.) that are not life-like (e.g., when a digital effects such as pan, tilt, and/or zoom), thereby creating displays of video image data that are not life-like.

A camera captures an image of a scene by directing light onto a flat image sensor. In many settings, a wide-angle camera may be used to image multiple subjects of interest that are spread out in a scene. Such cameras employ a wide-angle lens to capture light from a wide angular field-of-view (FOV), but suffer from various types of optical distortion. Standard low geometric distortion lenses may have a horizontal FOV of between 40° and 70° and have mild distortion, whereas wide-angle angle (e.g., having a horizontal FOV of between 70°-90°) and ultra-wide-angle (e.g., having a horizontal FOV of greater than 90°) lenses may have more significant distortion of geometric object within an image frame.

Furthermore, in some settings, particularly indoors such as a conference room, some objects (e.g., people, furniture, structural elements, etc.) may be located at different distances from the camera lens, leading to discrepancies in apparent size and shape of the objects when imaged. The unnatural appearance of people and other objects in the images may provide for an unsatisfactory experience for remote videoconference participants. Wide angle cameras equipped with low geometric distortion lenses may suffer from trapezoidal stretching at higher field angles, while wide angle cameras equipped with fisheye lenses may suffer from curvature of straight-line objects, such as walls of a room, at higher field angles.

In some distortion correction approaches, a raw image is mapped to an analytical projection that yields a corrected image. The analytical projection may approximate the arrangement of people and/or other objects of interest in the imaged space, such as a cylindrical projection for people arranged in a semi-circle. In some examples, the mapping may be based upon an optical center of a lens of the camera. Likewise, the projection also may be based on a known or approximate distortion function of the lens (e.g., received from a manufacturer of the lens). In the corrected image, vertically oriented objects in the scene, such as people or objects, may appear straight and vertically oriented instead of warped and/or leaning, and thus have a more natural appearance. As used herein, the term "raw image" means an image that is generated without any distortion correction having been applied, and that may include monochrome images, color images, and images that have been at least partially processed.

However, some camera placements and arrangements of objects in the imaged scene may pose challenges to distortion correction. For instance, a videoconferencing camera may be placed at one end of a room, for example high on a wall above, or attached to the top of, a videoconference display, and tilted downwards to capture subjects seated around a conference table. In this example, objects at a far end of the conference table opposite the camera may be located at a relatively far distance from the camera near the center of the raw image, while objects at the near end of the conference table adjacent to the camera may be located relatively close to the camera near the edges of the raw image. As objects close to the camera may be located at extreme viewing angles, this may lead to foreshortening effects and/or trapezoidal distortion for these objects (e.g., a person, table, etc.). At the same time, objects farther from the camera may appear small compared to other subjects. As a result, using a wide-angle or an ultra-wide-angle lens in a conference room setting, for example, people in an image standing close to the camera and/or near the sides of the FOV may appear to be warped, among other distortions. Such distortions may be further apparent when performing pan, tilt, and/or zoom functions that are software-implemented (e.g., as opposed to mechanically, or optically, implemented).

A consistent appearance of face objects at various field angle positions across a wide field of view camera scene may be maintained by use of an anamorphic analytical projection type distortion correction. However, such full frame correction may have limitations. As such, a balanced approach may lead to tradeoffs in various other aspects, such as a curved vs straight appearance of straight line objects in various orientations, while minimizing face appearance across the full FOV.

Accordingly, some examples are provided herein that relate to correcting distortion of an image by using an analytical projection. In some examples, a stream of input images (e.g., wide-angle or ultra-wide-angle input images) is received, a digital effect (e.g., a pan, tilt, or zoom feature that is implemented independent of mechanical movement) is applied to the stream of input images, an analytical projection type is determined, and the analytical project type is applied to the stream of input images, to generate a modified stream of input images. Accordingly, using mechanisms described herein, a geometric distortion within the stream of input images is corrected, in the modified stream of input images, while applying the digital effect.

Advantages of mechanisms disclosed herein may include an improved user-experience through generating a modified stream of images that corrects distortion within an input stream of images, as a digital effect is being applied to the input stream of images. Furthermore, when images include objects that are distorted, users may be unable to take accurate geometric measurements of the objects; accordingly, mechanisms disclosed herein allow for accurate measurements to be taken of objects in an input video stream, by correcting distortion that may otherwise exist.

Additionally, since the mechanisms disclosed herein include analytical functions, it should be appreciated by those of ordinary skill in the art that no model (e.g., machine-learning models) needs to be trained. Therefore, relative to mechanisms that may require compiling, storing, and/or processing large data sets to train accurate models, mechanisms disclosed herein are computationally efficient. Namely, instead of data sets being stored (e.g., requiring large amount of memory) and processed (e.g., requiring large amounts of processing power), mechanisms discussed herein rely on analytical functions that can directly map pixels from a raw image to pixels of a modified image, thereby avoiding a loss of resolution in images that may otherwise be caused by trained models.

By using camera parameters, including one or more of lens distortion profile data, image sensor pixel size, image sensor resolution, and x & y optical center (OC) position data, the field angles represented by pixel location may be derived for that camera, such that the image content may be manipulated through any choice of direct analytical projection (i.e., Rectilinear, Cylindrical, Spherical) or indirect analytical projection (i.e., ZoomRect, SoftRect) distortion correction, or dewarp type, but by further derivation of an effective, or virtual, optical axis which enables virtual camera pointing which may differ from the physical optical axis of the camera, any analytical projection type or analytical projection surface may be modified to compensate for camera pitch as well as azimuth and elevation angle within a defined orientation with respect to a geometrical scene, so as to compensate physical pointing and enable an apparent camera pointing angle which does not require any physical movement of the camera. Since field angles within the acceptance solid angle of the camera FOV are calibrated in terms of physical angles, the apparent or virtual pointing of a camera may be modified digitally in terms of an angular compensation of the camera space orientation into the scene geometry space, as desired, and further enable compensation of azimuth and elevation angles with respect to a scene geometry (thus with respect to camera and/or scene orientation) such that perspective appearance of objects at specified pointing angles is corrected for a given frame. Such a modified analytical projection may then provide a more lifelike appearance of a pan, tilt, and zoom effect, as if the camera is physically changing pointing angle, but digitally controlled without requiring mechanical or opto-mechanical movement.

FIG. 1 shows an example of a system 100, in accordance with some aspects of the disclosed subject matter. The system 100 may be a system for processing a stream of input images and/or correcting geometric distortion using analytical projection. Additionally, or alternatively, the system 100 may be a system for correcting distortion using analytical projection. The system 100 includes one or more computing devices 102, one or more servers 104, a video data source 106, and a communication network or network 108. The computing device 102 can receive video stream data 110 from the video data source 106, which may be, for example a webcam, video camera, video file, image sensor, etc. Additionally, or alternatively, the network 108 can receive video stream data 110 from the video data source 106, which may be, for example a webcam, video camera, video file, image sensor, etc.

Computing device 102 may include a communication system 112, a digital effect engine or component 114, and/or a distortion correction engine or component 116. In some examples, computing device 102 can execute at least a portion of the digital effect component 114 to apply a digital effect, such as a pan, tilt, and/or zoom effect, to a video stream. The digital effect may simulate a change in elevation or a change in azimuth of a lens optical axis, without physical moving an optical axis of the lens. Further, in some examples, computing device 102 can execute at least a portion of the distortion correction component 116 to correct a geometric distortion to one or more objects within a video stream (e.g., corresponding to the video stream data 110). The geometric distortion may be corrected by applying distortion correction techniques (e.g., dewarping) that may incorporate, for example, analytical projections or meshes.

Server 104 may include a communication system 112, a digital effect engine or component 114, and/or a distortion correction engine or component 116. In some examples, server 104 can execute at least a portion of the digital effect component 114 to apply a digital effect, such as a pan, tilt, and/or zoom effect, to a video stream. The digital effect may simulate a change in elevation or a change in azimuth of a lens optical axis, without physical moving an optical axis of the lens. Further, in some examples, server 104 can execute at least a portion of the distortion correction component 116 to correct a geometric distortion to one or more objects within a video stream (e.g., corresponding to the video stream data 110). The geometric distortion may be corrected by applying distortion correction techniques (e.g., dewarping) that may incorporate, for example, analytical projections or meshes.

Additionally, or alternatively, in some examples, computing device 102 can communicate data received from video data source 106 to the server 104 over a communication network 108, which can execute at least a portion of the digital effect component 114, and/or the distortion correction component 116. In some examples, the digital effects component 114 may execute one or more portions of method/process 800 described below in connection with FIG. 8. Further in some examples, the distortion correction component 116 may execute one or more portions of method/process 800 described below in connection with FIG. 8.

In some examples, computing device 102 and/or server 104 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 102 and/or a plurality of servers 104.

In some examples, video data source 106 can be any suitable source of video stream data (e.g., data generated from a computing device, data generated from a webcam, data generated from a video camera, data generated from an image sensor, etc.) In a more particular example, video data source 106 can include memory storing video stream data (e.g., local memory of computing device 102, local memory of server 104, cloud storage, portable memory connected to computing device 102, portable memory connected to server 104, etc.). In another more particular example, video data source 106 can include an application configured to generate video stream data (e.g., a teleconferencing application with video streaming capabilities, a digital effect application, and/or a distortion correction application being executed by computing device 102, server 104, and/or any other suitable computing device).

The video stream data 110 may correspond to a stream of images, thereby allowing for mechanisms described herein to be applied to the stream of images. Additionally, or alternatively, the video stream data 110 may correspond to a plurality of frames of still images, thereby allowing for mechanisms described herein to be applied to one or more frames of the plurality of frames of still images.

In some examples, video data source 106 can be local to computing device 102. For example, video data source 106 can be a camera or other type of image sensor that is coupled to computing device 102. Additionally, or alternatively, video data source 106 can be remote from computing device 102, and can communicate video stream data 110 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

In some examples, the computing device 102 may be a tablet computing device that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 2:
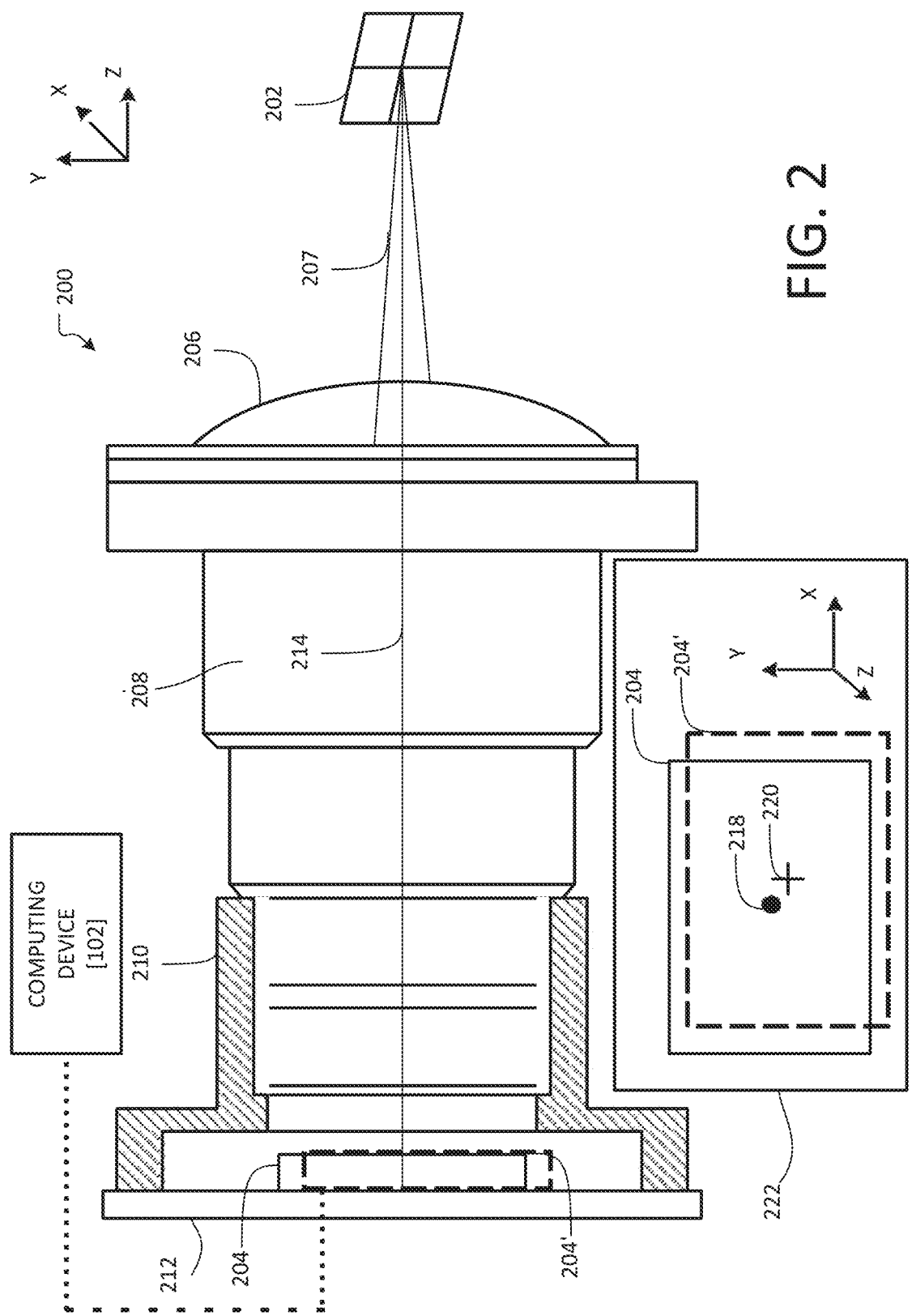
FIG. 2 illustrates an example camera, according to some aspects described herein.

FIG. 2 illustrates an example camera 200. The camera 200 may be a video data source that is similar to the video data source 106, described with respect to FIG. 1. The camera 200 is configured to image a scene 202. The camera 200 includes an image sensor 204 and a lens 206 positioned to direct object light 207 from the scene 202 onto the image sensor 204. The lens 206 may take any suitable shape and may including any suitable optical material having any suitable optical characteristics. In some implementations, the lens 206 may be a system of two or more lenses or other optical elements.

As a more specific example, the lens 206 may comprise a known linear or near-linear lens distortion function. The lens 206, having lens elements held in lens barrel 208, may be maintained in a center fixed position relative to the image sensor 204 via a holder mount structure 210. In some examples, the holder mount structure 210 is a rigid holder structure that fixes the lens barrel 208, and thus all elements in the lens 206 relative to the image sensor 204 along every axis in six degrees of freedom (e.g., x, y, z, tip, tilt, azimuth rotation). For example, a fixed-focus camera may have such an arrangement. In some examples, the holder mount structure 210 may allow movement of the lens barrel 208 relative to the image sensor along one or more axes (e.g., for image stabilization and/or focus, such as by placing an auto-focus voice-coil actuator between lens barrel 208 and holder mount structure 210). In such examples, the lens 206 is still center fixed relative to the image sensor 204 even though the position of the lens 206 may move along the z axis relative to the position of the image sensor 204.

In the illustrated example camera, the lens barrel 208 is operatively coupled to the holder mount structure 210. The holder mount structure 210 is mounted to a printed circuit board (PCB) 212. In one example, the holder mount structure 210 is bonded to the PCB 212 via an adhesive. The image sensor 204 is mounted on the PCB 212 such that an optical axis 214 of the lens 206 is substantially aligned with a center of the image sensor 204. In particular, the lens barrel 208, the holder mount structure 210, and the PCB 212 collectively maintain the lens 206 in optical alignment with the image sensor 204 (e.g., for the case of using a threaded lens barrel 208 and holder mount structure 210, the holder mount structure 210 may be bonded in position relative to PCB 212 to fix x, y, z position and tip/tilt angle while threads may be substantially used to set the focus). Alternatively, as may be the case for using active alignment (AA), pre-focus position may be set by optically, or mechanically, fixing focus position between lens barrel 208 and holder mount structure 210. Once fixed in this manner, the lens and holder assembly may be actively adjusted in all degrees of freedom and bonded with a gap bond between holder mount structure 210 and PCB 212 to fix x, y, final z focus, tip, tilt and azimuth rotation. Further still, a threadless lens holder may first be bonded to PCB, followed by AA positioning and bonding of a lens having threadless lens barrel.

The camera 200 may be coupled to or otherwise in communication with a controller or other type of computing device, such as computing device 102. The computing device 102 (e.g., a controller) may be configured to control the image sensor 204 to acquire images of the scene 202 as well as to perform other control operations of the camera 200 as discussed herein. The computing device 102 includes a logic subsystem and a storage subsystem. The logic subsystem includes one or more physical devices configured to execute instructions held by the storage subsystem to enact any operation, algorithm, computation, or transformation disclosed herein. In some implementations, the logic subsystem may take the form of an application-specific integrated circuit (ASIC) or system-on-a-chip (SoC), in which some or all of the instructions are hardware- or firmware-encoded. The logic subsystem and the storage subsystem of the computing device 102 are discussed in further detail with reference to FIG. 3.

During the process of manufacturing the camera 200, manufacturing tolerances of the camera 200 may result in camera-to-camera variations in optical alignment of the image sensor 204 and the lens 206 that may result in a position of the image sensor being shifted from an ideal position that is aligned with the lens 206. The image sensor 204' is shown having a position that is shifted relative to the ideal position of the image sensor 204 that is aligned with the lens 206. Moreover, manufacturing tolerances of the lens 206 itself may contribute to variations in optical alignment of the image sensor 204 and the lens 206. As shown in the sidebar 222, the optical axis 214 of the lens 206 is centered at an actual optical center 218 of the lens 206 relative to the image sensor 204 when the image sensor 204 is ideally aligned with the lens 206. However, the actual optical center 218 of the lens 206 is offset from a center 220 of the image sensor 204' when the image sensor 204' has a position that is shifted relative to the ideal position of the image sensor 204. The difference between the center 220 of the image sensor 204' and the actual optical center 218 of the lens 206 may affect the image distortion attributed to the lens 206 (e.g., geometric distortion of objects within a video stream received, via the lens).

The actual optical center 218 may vary from camera to camera such that different cameras generate raw images having different distortion based on having different camera-specific optical centers. As such, in some examples, the application of an analytic projection distortion correction to an image may be based upon a determined optical center along with lens nominal distortion data. The optical center may be determined in any suitable manner. As one example, the optical center may be determined on a camera-by-camera basis during manufacturing by projecting a flat field of illumination through lens 206 onto the image sensor 204, and measuring a centroid of an image intensity profile to determine the optical center. Note that if the camera includes lenses that have limited relative illumination roll-off, a live image based pointing measurement including a calibrated test setup having an optical target with positional reference to the lens optical axis, which may be repeatably mounted by use of kinematic mechanical mounting of lens barrel, may be expected to provide higher accuracy for optical center measurement. As another example, a laser beam aligned with the optical axis 214 may be used to measure the optical center 218. In other examples, an analytic projection distortion correction may be based upon any other suitable calibration.

Figure 3:
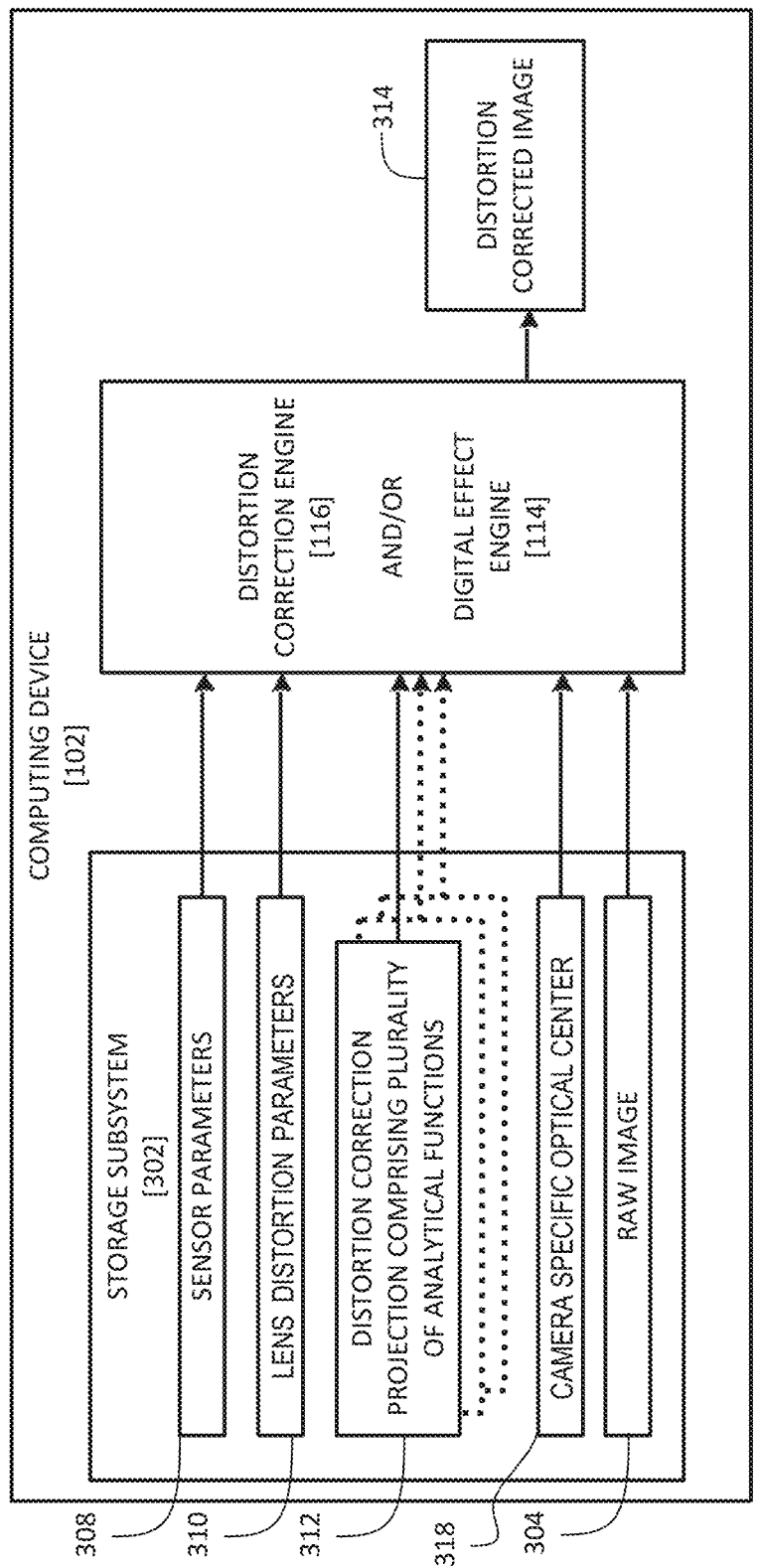
FIG. 3 illustrates a detailed view of the computing device from the system of FIG. 1.

FIG. 3 shows a detailed view of the computing device 102, according to some aspects described herein. The computing device 102 is configured to receive a raw image 304 of a scene via the image sensor 204. In some examples, the computing device 102 may be configured to acquire or otherwise obtain the raw image 304 via the image sensor 204. The computing device 102 may be configured to load the raw image 304 in a storage subsystem 302 corresponding to the camera 200. The computing device 102 is further configured to generate a distortion corrected image 314 from the raw image 304, which may be based on the camera-specific optical center 218 of the camera 200 or other suitable calibration. The measured camera-specific optical center 218 or other calibration may be stored in the storage subsystem 302 (e.g., electrically erasable programmable read-only memory (EEPROM) or other nonvolatile memory) such that the camera-specific optical center 218 or other calibration may be made available for use in performing distortion correction operations.

The measured camera-specific optical center 218 may be represented as (x, y, z) coordinates in a coordinate space of the image sensor 204. Due to lens distortion and/or alignment variances, the measured camera-specific optical center 218 may be offset from an actual center position of the image sensor 204. While use of optical center (OC) position data is not required to perform a distortion corrected image, the magnitude of effective distortion of the corrected image may increase with an increase in OC deviation from the origin position used in an analytical projection mapping. As an example, in some applications, small OC error, i.e. on order of <5-10 pixels, may provide sufficient accuracy, while other applications may utilize higher accuracy OC data. Further, the optical center may be offset from the center of sensor in order to facilitate an angular bias in the FOV, e.g. offset of the sensor active area along the vertical dimension so as to bias the vertical FOV cone to image more downward in the scene for a camera mounted at a high level in a room. In such case, OC position data may indicate deviation from the target origin position used in the projection mapping. Further still, an offset region of interest, or image crop, from a smaller region within an oversized image sensor area may be used to achieve offset imaging. As an example, a digital effect, such as pan, tilt, and/or zoom may may be combined with tilt correction, in order to achieve both VFOV bias angle in combination with tilt compensation.

As discussed, earlier herein the computing device 102 includes the digital effect component 114 and/or the distortion correction component 116. The distortion correction component 116 is configured to translate pixel locations of pixels of the raw image 304 according to a distortion correction projection 312 comprising a plurality of analytical functions to generate the distortion corrected image 314.

Note that the pixel locations of different pixels in the raw image may be translated and/or interpolated, such as by application of a mesh grid indicating mapping of each integer (x, y, z) pixel of a distortion corrected image to a floating-point position within the original input image (x', y', z'), on an individual pixel basis based on the distortion correction projection. As such, in different instances, pixel locations of different pixels may be translated differently (e.g., different direction and/or distance of translation for different pixels), pixel locations of different pixels may be translated the same (e.g., same direction and/or distance of translation for different pixels), and/or pixel locations of some pixels may remain the same between the raw image 304 and the distortion corrected image 314. Furthermore, distortion correction may include stretching and/or compressing portions of an image.

As described in more detail below, the distortion correction component 116 is configured to perform distortion correction mapping according to a distortion correction projection 312 that includes a plurality of analytical functions. The distortion correction component 116 optionally may utilize the measured camera-specific optical center 318, image sensor parameters 308 and/or lens distortion parameters 310 as inputs. In one example, the image sensor parameters 308 may include a resolution of the image sensor 204 (e.g., a number of pixels included in the image sensor in both x and y dimensions) and a pixel size of pixels of the image sensor 204 (e.g., size of pixel in both x and y dimensions). In other examples, other image sensor parameters may be considered for the distortion correction projection 312. In one example, the lens distortion parameters 310 may include distortion data, such as image real height versus field angle of the lens 206. In other examples, other lens distortion parameters may be considered for the distortion correction projection 312. In some examples, a plurality of distortion correction projections 312 may be stored, e.g., corresponding to different analytical functions, different tilt angles and/or different types of projections (e.g. cylindrical, spherical, and/or rectilinear).

Further, in some examples, distortion correction component 116 may, in response to an input, change from a current analytical projection mapping to a different analytical projection mapping. For example, computing device 102 may receive an input for a zoom request, a pan, request, and/or a tilt request and, in response to the input, control distortion correction component 116 to select a distortion correction projection 312 comprising an analytical function to apply for the selected level of zoom, pan, and/or tilt.

The sensor parameters 308 and the lens distortion parameters 310 may be known for the particular type of camera configuration that uses the lens 206 and the image sensor 204. For example, the sensor parameters 308 and the lens distortion parameters 310 may be the same for every camera in a particular manufacturing lot, whereas each camera of the particular manufacturing lot may have a different measured camera-specific optical center due to variations in manufacturing of the cameras. In various implementations, sensor parameters 308 and lens distortion parameters 310 may be stored in storage subsystem 302, and/or hard coded into distortion correction algorithm(s).

The distortion correction projection 312 defines a relationship between the pixel locations of the raw image 304 and the translated pixel locations of the distortion corrected image 314 as an inverse function in which the sensor coordinates are mapped to projection plane and/or surface coordinates of the distortion correction projection 312.

Figure 4:
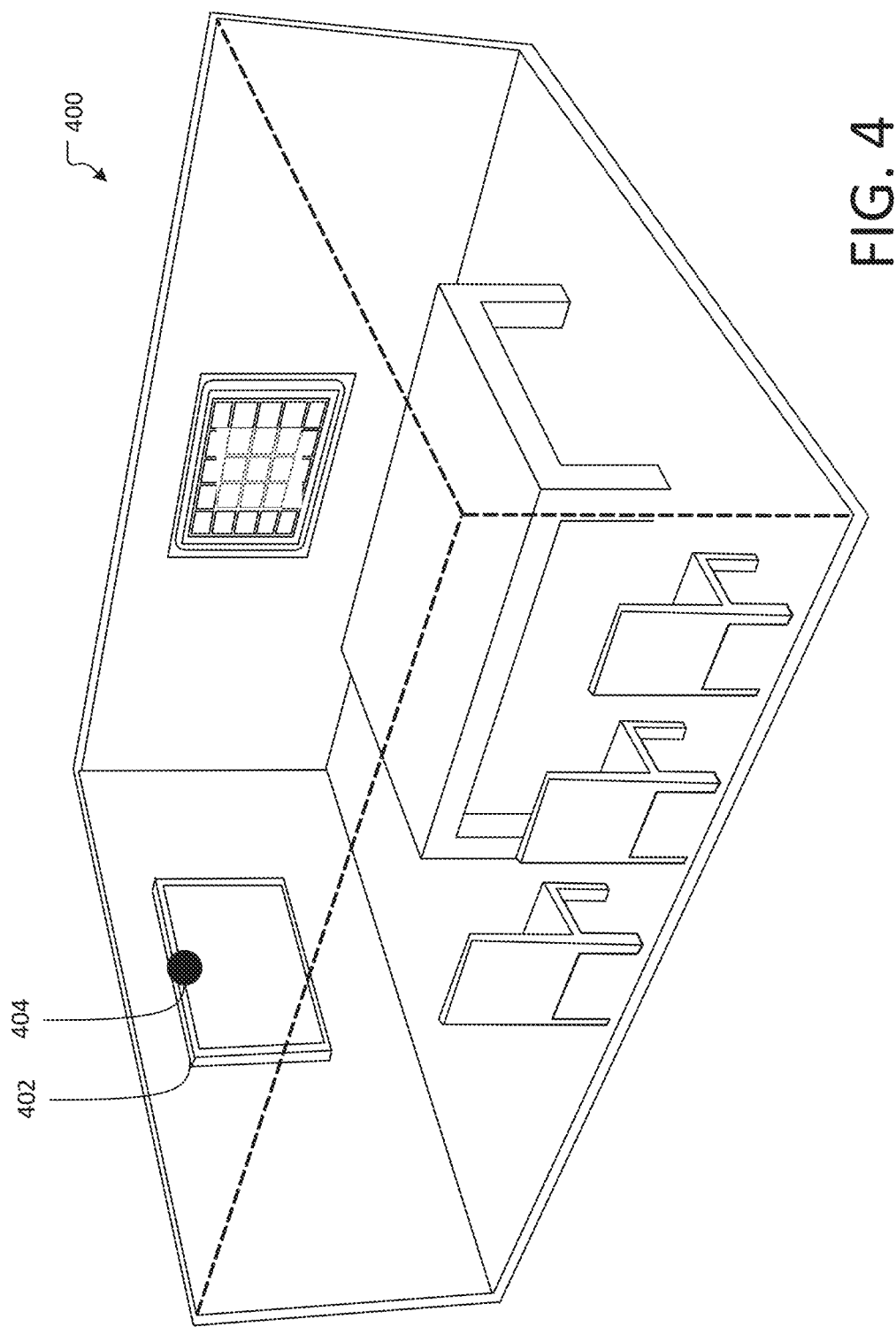
FIG. 4 illustrates an example conference room comprising a camera.

FIG. 4 shows an example conference room 400 comprising a videoconferencing display 402 and a camera 404. The camera 404 may be similar to the camera 200 discussed above with respect to FIG. 2. In FIG. 4, the camera 404 is located above the display 402, but may be located to a different side of the display 402 in other examples, including left, right, or below.

As discussed above, a distortion correction can comprise applying an analytical projection to a stream of input images, to generate a modified stream of images. Mechanisms described herein correct a geometric distortion within the stream of input images (e.g., of a table, or chair, or person, or other object), in the modified stream of images, while applying the digital effect. The analytical projection may comprise a direct analytical projection, such as rectilinear, cylindrical, or spherical projection. Additionally, or alternatively, the analytical projection may comprise indirect analytical projections such as non-radial distortion correction ZoomRect-SG or radial distortion correction SoftRect.

Figure 5B:
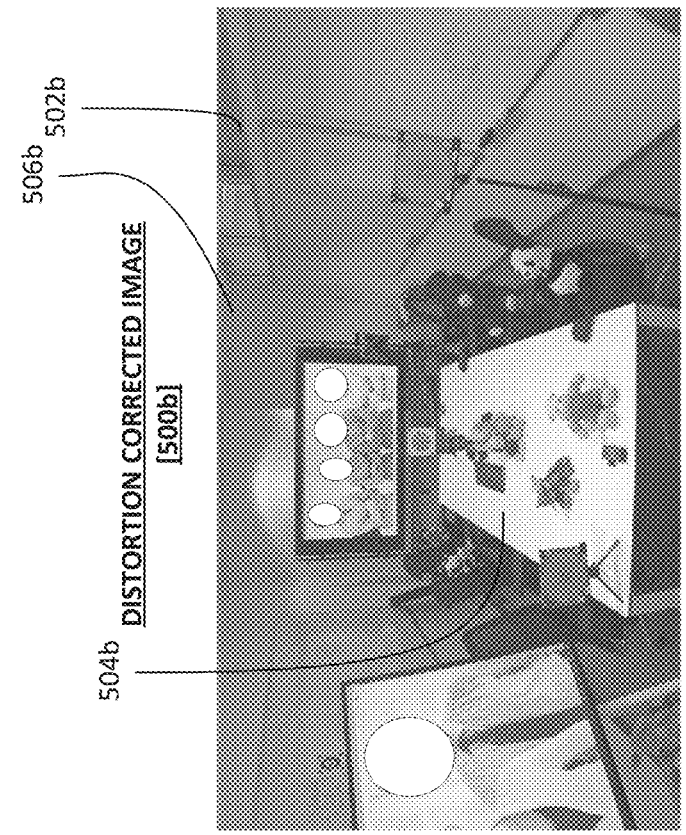
FIG. 5B illustrates an example second image that has been obtained by modifying the first image of FIG. 5A, using some mechanisms described herein.
Figure 5A:
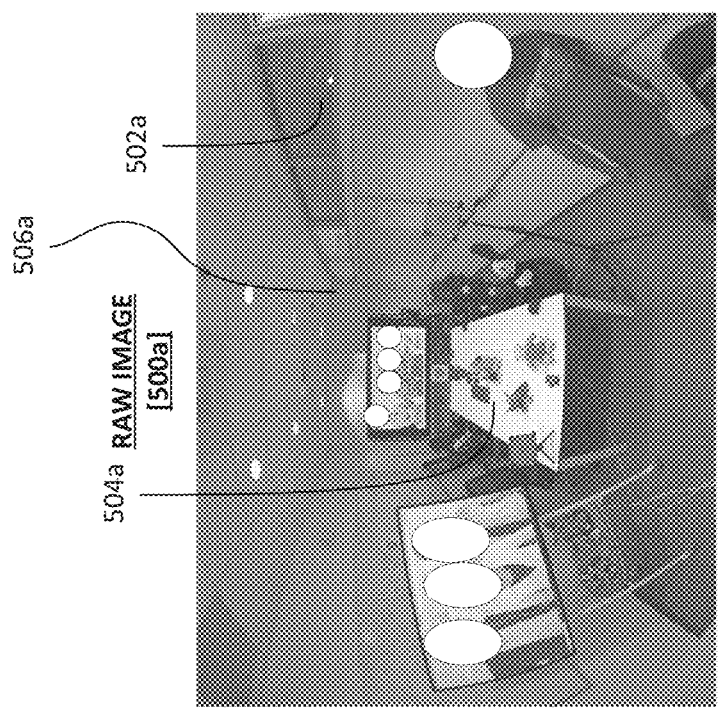
FIG. 5A illustrates an example first image, according to some aspects described herein.

FIG. 5A illustrates a raw image 500a that may be taken from a camera, such as the camera 404. FIG. 5B illustrates a distortion corrected image 500b that may correspond to the raw image 500a. The raw image 500a may be similar to the raw image 304 (see FIG. 3) and the distortion corrected image 500b may be similar to the distortion corrected image 314 (see FIG. 3). The raw image 500a may be a single frame from a stream of input images. Accordingly, it should be recognized that mechanisms disclosed herein may be applied on a frame-by-frame basis. Additionally, or alternatively, mechanisms disclosed herein may be applied, in real-time, to a stream of input images.

The raw image 500a includes pixels that correspond to a plurality of objects, such as windows 502a, a table 504a, and a ceiling 506a. Each of the plurality of objects (e.g., windows 502a, table 504a, and ceiling 506a). exhibit geometric distortion caused by a lens, through which light corresponding to the raw image 500a is received. The geometric distortion may include pincushion distortion, barrel distortion, fisheye distortion, and/or other types of geometric distortion that may be recognized by those of ordinary skill in the art.

Distortion correction or dewarp may be used to correct geometric distortion of the raw image 500a to generate, at least in part, the distortion corrected image 500b. Generally, when a digital effect, such as pan, tilt, or zoom function, is applied to the raw image 500a, geometric distortion within the raw image 500a may be generated or exaggerated. Accordingly, use of digital effects on input video streams that contain raw images, such as raw image 500a, may increase a desirability of applying adequate distortion correction.

Examples of the distortion correction may include a rectilinear dewarp technique (for radially symmetric distortion correction), a ZoomRect-SG technique (for non-radially symmetric distortion correction), a cylindrical dewarping technique (for non-radially symmetric distortion correction), or other suitable distortion correction techniques.

As an example of distortion, the windows 502a of the raw image 500a are shown to be curving about a center of the raw image 500a. Comparatively, after the distortion is corrected, the windows 502b of the distortion corrected image 500b are shown to be relatively vertical, with respect to a vertical edge of the raw image 500a and/or the distortion corrected image 500b (e.g., the windows 502b are straightened out, relative to the curvature shown in the raw image 500a). Accordingly, distortion correction applied to the raw image 500a may reduce distortion of the windows 502b, as described herein.

As another example of distortion, the table 504a of the raw image 500a is shown to be generally trapezoidal. For example, a far edge of the table 504a is significantly smaller than a close edge of the table 504a, wherein the far edge of the table 504a and the close edge of the table 504a are defined with respect to an image sensor at which the raw image 500a is received. Comparatively, after the distortion is corrected, the table 504b of the distortion corrected image 500b is more trapezoidal than the table 504a. For example, a far edge of the table 504b is similar in horizontal length to a close edge of the 504b, relative to the lengths of the far edge and the close edge of the table 504a of the raw image 500a. Further, straight line edges of the table that appeared curved in 504a, are corrected to appear straight in 504b.

As still another example of distortion, the ceiling 506a of the raw image 500a is shown to be generally curved about a center of the raw image 500a, due to f-theta lens distortion which is a type of fisheye distortion. For example, laterally opposed points of the ceiling 506 (e.g., points that are horizontally across from each other in the raw image 500a) are vertically lower than a center point of the ceiling 506a that is horizontally between the laterally opposed points. Comparatively, after the distortion is corrected, the ceiling 506b is relatively straight, horizontally, such that laterally opposed points of the ceiling 506 are at about the same height as a center point of the ceiling 506b that is horizontally between the laterally opposed points.

Additional and/or alternative examples of distortion correction may be recognized by those of ordinary skill in the art, at least in light of the teachings described herein. Generally, mechanisms described herein are applied to create life-like images in which distortion created by lenses, that may be further exaggerated by applied digital effects, are corrected using analytical distortion correction algorithms.

Figure 6:
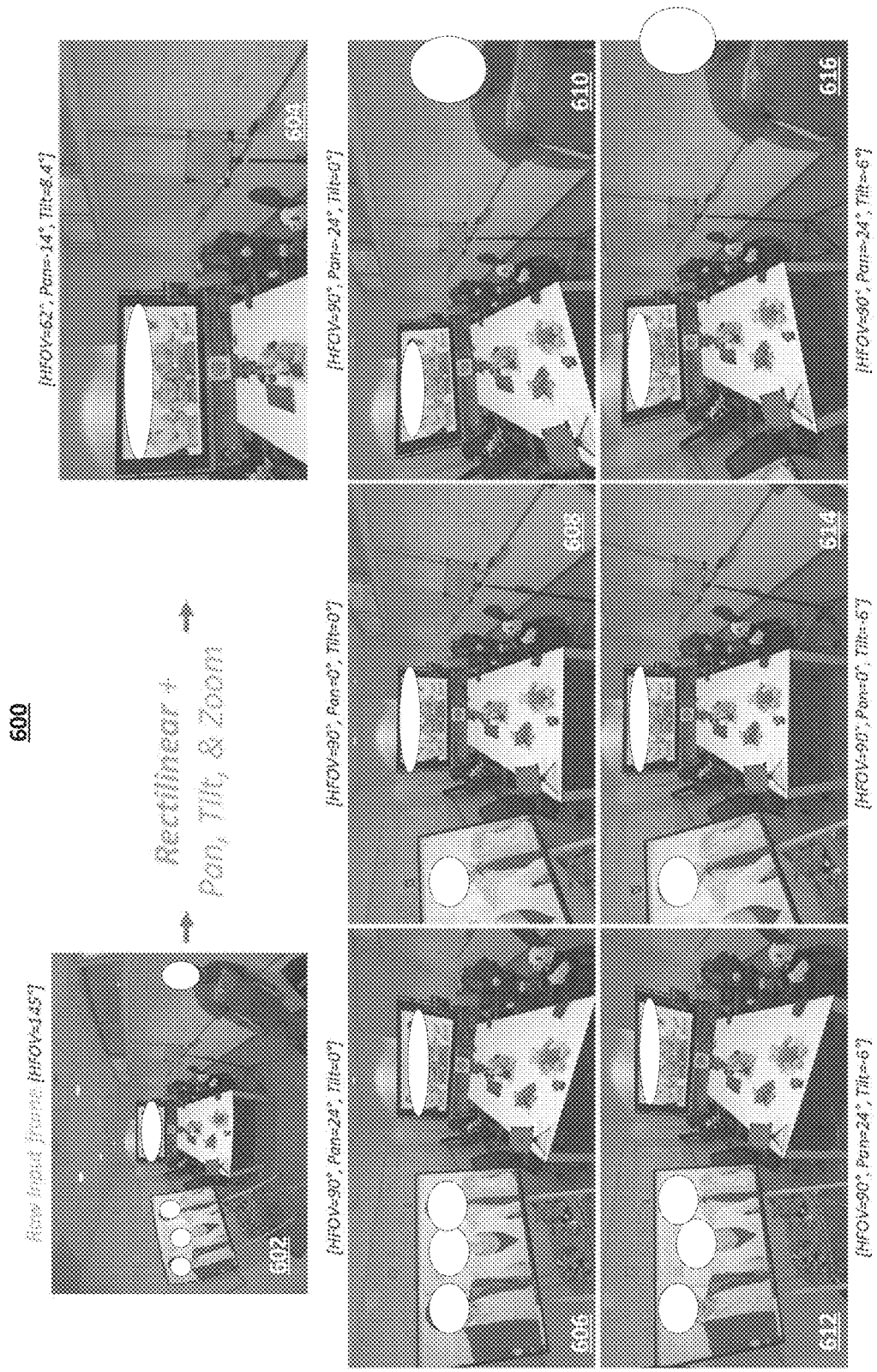
FIG. 6 illustrates an examples use-case according to some aspects described herein.

FIG. 6 illustrates an example use-case 600 according to some aspects described herein. In the example use-case 600, a raw image 602 is provided. The raw image 602 has a horizontal field of view of 145 degrees. A rectilinear analytical projection is applied to the raw image 602, along with a pan, tilt, and zoom function to generate a modified image, such as the first modified image 604, the second modified image 606, the third modified image 608, the fourth modified image 610, the fifth modified image 612, the sixth modified image 614, and the seventh modified image 616. The pan, tilt, and zoom function may be any of a plurality of pan, tilt, and zoom functions that generates, for example, one or more of the modified images 604-616. In some examples, a direct analytical projection, other than the rectilinear analytical projection, may be applied to the raw image 602, along with a pan, tilt, and zoom function, to generate a modified image.

The first modified image 604 has a horizontal field of view of 62 degrees, a pan of −14 degrees, and a tilt of 8.4 degrees. The second modified image 606 has a horizontal view of 90 degrees, a pan of 24 degrees, and a tilt of 0 degrees. The third modified image 608 has a horizontal field of view of 90 degrees, a pan of 0 degrees, and a tilt of 0 degrees. The fourth modified image 610 has a horizontal field of view of 90 degrees, a pan of −24 degrees and a tilt of 0 degrees. The fifth modified image 612 has a horizontal field of view of 90 degrees, a pan of 24 degrees and a tilt of −6 degrees. The sixth modified image 614 has a horizontal field of view of 90 degrees, a pan of 0 degrees, and a tilt of −6 degrees. The seventh modified image 616 has a horizontal field of view of 90 degrees a pan of −24 degrees and a tilt of −6 degrees.

It should be recognized that the exemplary pan and tilt rotations of use-case 600 may be in either a positive or a negative relative direction. Further, while specific magnitudes of the horizontal field of view, pan rotations, and tilt rotations have been provided with respect to use-case 600, alternative magnitudes of the horizontal field of view, the pan rotations, and the tilt rotation may be applied to the raw image 602 to generate additional and/or alternative modified images to those illustrated in FIG. 6.

Geometric distortion of the raw image 602, relative to the modified images 604-616 should be recognized by those of ordinary skill in the art. Generally, geometric distortion illustrated in the raw image 602 is corrected, either partially or fully, within the modified images 604-616. Furthermore, it should be recognized that the raw image 602 may be converted to one or more of the plurality of modified images 604-616, using mechanisms disclosed herein. Additionally, or alternatively, one of the modified images 604-616 may be converted directly to another of the modified images 604-616, using mechanisms disclosed herein, such as by applying a new analytical projection and pan, tilt, and/or zoom function to the one of the modified images 604-616. In this respect, mechanisms disclosed herein provide for the ability to fluidly move between modified image views, while reducing an amount of geometric distortion that is present in a received raw image. The level of zoom set may range from full FOV supported by the raw image 602 to any partial FOV within that full FOV.

Figure 7:
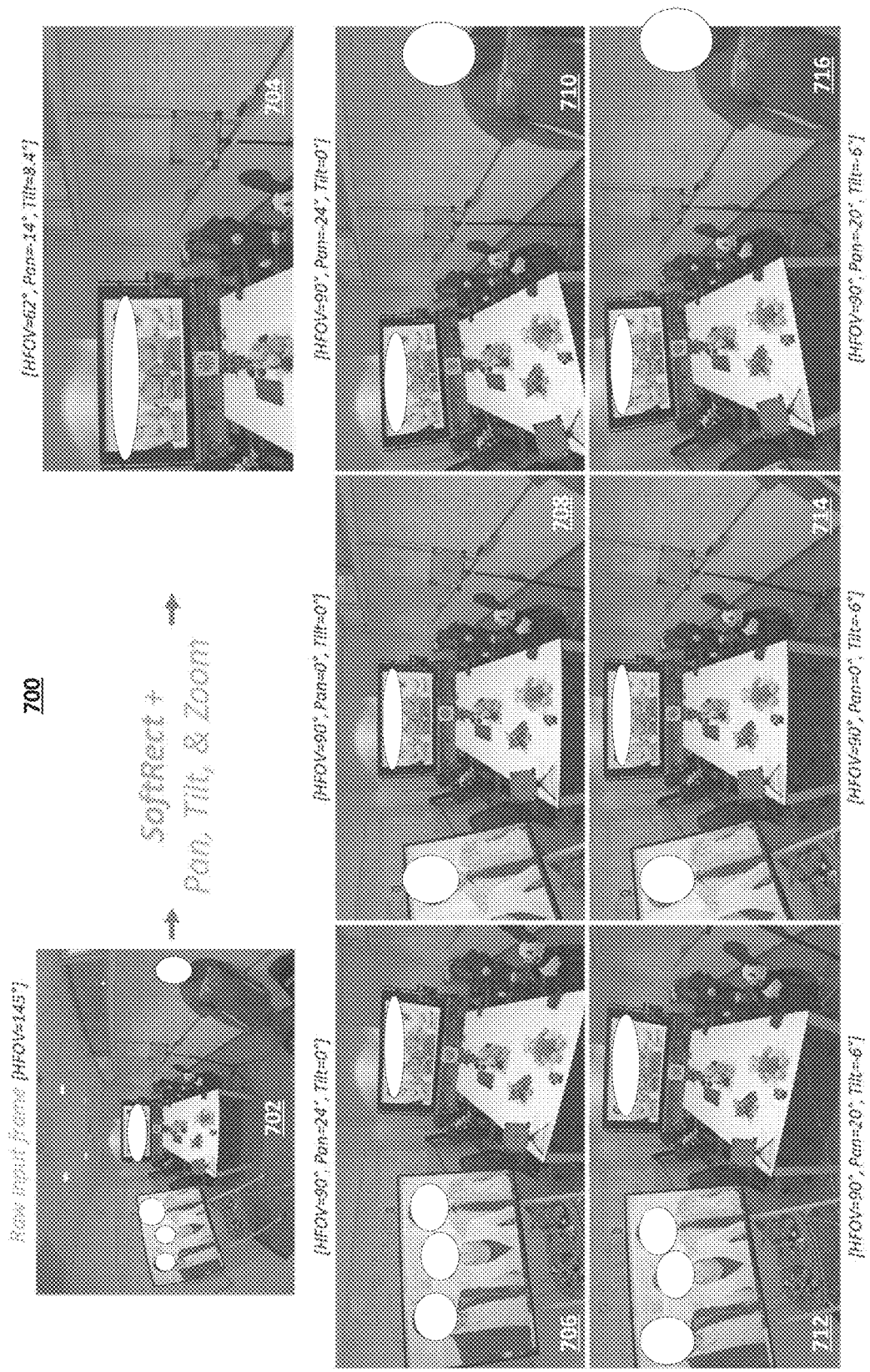
FIG. 7 illustrates an example use-case according to some aspects described herein.

FIG. 7 illustrates an example use-case 700 according to some aspects described herein. In the example use-case 700, a raw image 702 is provided. The raw image has a horizontal field of view of 145 degrees. A SoftRect analytical projection, which applies a parabolic radial distortion correction, is applied to the raw image 702, along with a pan, tilt, and zoom function to generate a modified image, such as the first modified image 704, the second modified image 706, the third modified image 708, the fourth modified image 710, the fifth modified image 712, the sixth modified image 714, and the seventh modified image 716. The pan, tilt, and zoom function may be any of a plurality of pan, tilt, and zoom functions that generates, for example, one or more of the modified images 704-716. In some examples, an indirect analytical projection, other than the SoftRect analytical projection, may be applied to the raw image 602, along with a pan, tilt, and zoom function, to generate a modified image.

The first modified image 704 has a horizontal field of view of 62 degrees, a pan of −14 degrees, and a tilt of 8.4 degrees. The second modified image 706 has a horizontal view of 90 degrees, a pan of 24 degrees, and a tilt of 0 degrees. The third modified image 708 has a horizontal field of view of 90 degrees, a pan of 0 degrees, and a tilt of 0 degrees. The fourth modified image 710 has a horizontal field of view of 90 degrees, a pan of −24 degrees and a tilt of 0 degrees. The fifth modified image 712 has a horizontal field of view of 90 degrees, a pan of 20 degrees and a tilt of −6 degrees. The sixth modified image 714 has a horizontal field of view of 90 degrees, a pan of 0 degrees, and a tilt of −6 degrees. The seventh modified image 716 has a horizontal field of view of 90 degrees a pan of −20 degrees and a tilt of −6 degrees.

It should be recognized that the exemplary pan and tilt rotations of use-case 700 may be in either a positive or a negative relative direction. Further, while specific magnitudes of the horizontal field of view, pan rotations, and tilt rotations have been provided with respect to use-case 700, alternative magnitudes of the horizontal field of view, the pan rotations, and the tilt rotation may be applied to the raw image 702 to generate additional and/or alternative modified images to those illustrated in FIG. 7.

Geometric distortion of the raw image 702, relative to the modified images 704-716 should be recognized by those of ordinary skill in the art. Generally, geometric distortion illustrated in the raw image 702 is corrected, either partially or fully, within the modified images 704-716. Furthermore, it should be recognized that the raw image 702 may be converted to one or more of the plurality of modified images 704-716, using mechanisms disclosed herein. Additionally, or alternatively, one of the modified images 704-716 may be converted directly to another of the modified images 704-716, using mechanisms disclosed herein, such as by applying a new analytical projection and pan, tilt, and/or zoom function to the one of the modified images 704-716. In this respect, mechanisms disclosed herein provide for the ability to fluidly move between modified image views, while reducing an amount of geometric distortion that is present in a received raw image.

Figure 8:
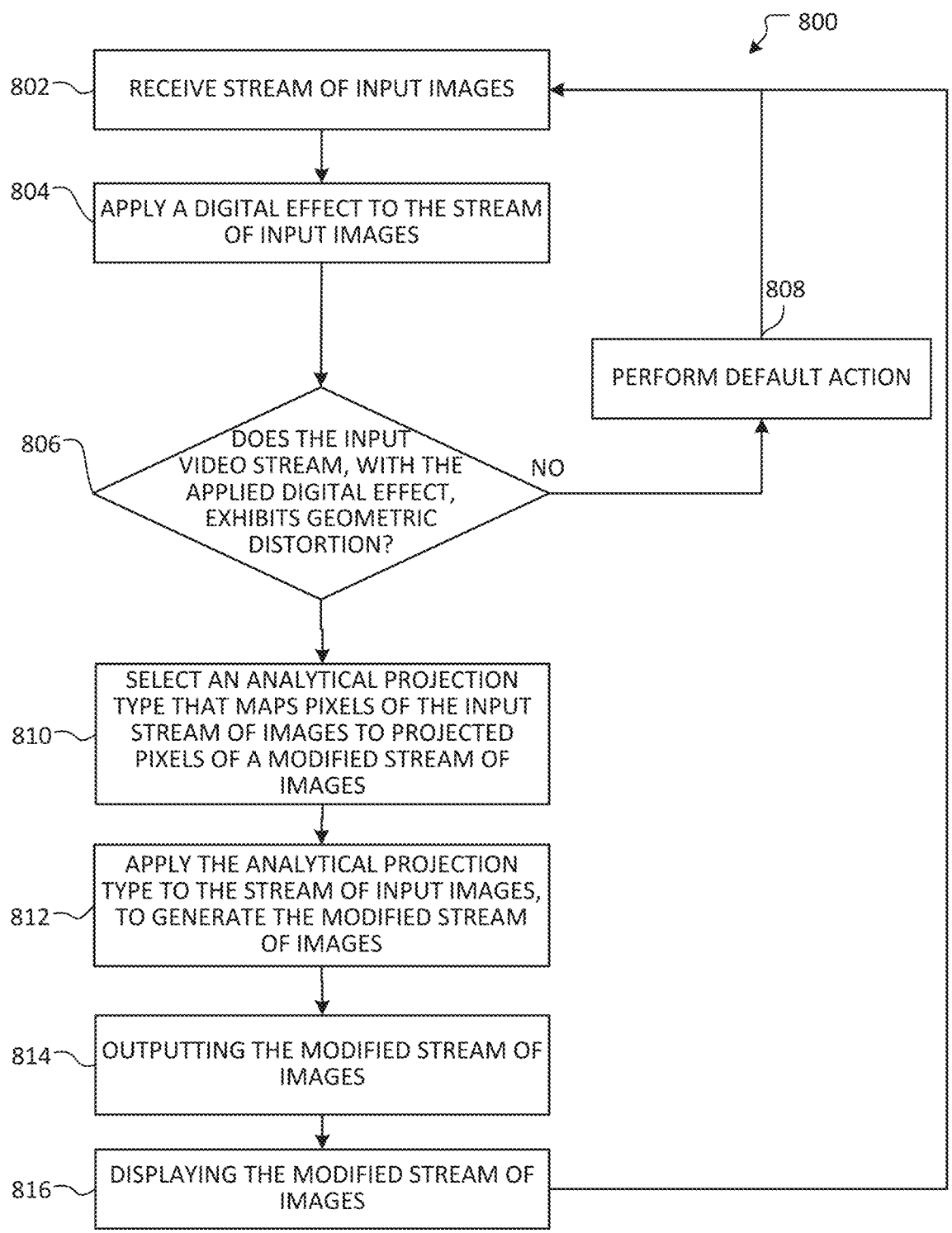
FIG. 8 illustrates an example method for correcting geometric distortion within an image, according to some aspects described herein.

FIG. 8 illustrates an example method 800 for processing a stream of input images (e.g., a stream of raw images, such as raw image 500a (FIG. 5A), raw image 602 (FIG. 6), and/or raw image 702 (FIG. 7). Method 800 may further be a method for correcting geometric distortion, within a stream of input images, using analytical projection. In examples, aspects of method 800 are performed by a device, such as computing device 102 and/or server 104, discussed above with respect to FIG. 1.

Method 800 begins at operation 802 wherein a stream of input images are received. In some examples, the stream of input images may be obtained or captured. The stream of input images may be wide-angle images or ultra-wide-angle images that are received from an image sensor (e.g., image sensor 204). A lens (e.g., lens 206) associated with the image sensor may have a horizontal field of view that is greater than 100 degrees, or greater than 120 degrees, or greater than 140 degrees, or greater than 160 degrees. The horizontal field of view may be less than 360 degrees, or less than 180 degrees. Further the horizontal field of view may be any range of values defined between the degree values aforementioned.

At operation 804, a digital effect is applied to the stream of input images. The digital effect may be one or more from the group of: a pan, a tilt, or a zoom, of the stream of input images. For example, the digital effect may be a pan, or a pan and a zoom, or a pan and a zoom and a tilt, etc. It should be recognized by those of ordinary skill in the art that a digital effect occurs independent of mechanical movement of a camera and/or lens to which the stream of input images correspond.

As discussed above with respect to the raw image 500a, and the distortion corrected image 500b, geometric distortion may be generated, increased, and/or made more apparent by applying the digital effect (e.g., of operation 804). Accordingly, mechanisms described below may be beneficial to address the geometric distortion that is generated, increased, and/or made more apparent by applying the digital effect to the stream of input images.

At operation 806, it is determined if the input video stream, with the applied digital effect, exhibits geometric distortion. For example, based on known manufacturing tolerances of a lens (e.g., lens 206) and/or calibration measurements of the lens, it can be determined whether the input video stream will exhibit geometric distortion. In some examples, operation 806 may also include determining a degree of geometric distortion that is exhibited (e.g., based on an amount of pan, tilt, and/or zoom that is applied to an image received through a given lens, such as lens 206). Alternatively, in some examples, it may be assumed that geometric distortion is exhibited, (e.g., based on calibration or provided tolerances of a lens, such as lens 206), such that method 800 advances from operation 804, directly to operation 810. Additional and/or alternative methods of determining if, and/or a degree to which, geometric distortion is exhibited may be recognized by those of ordinary skill in the art.

If it is determined that the input video stream, with the applied digital effect, does not exhibit distortion, flow branches "NO" to operation 808, where a default action is performed. For example, the stream of input images may have an associated pre-configured action. In other examples, method 800 may comprise determining whether the stream of input images has an associated default action, such that, in some instances, no action may be performed as a result of the received stream of input images. Method 800 may terminate at operation 808. Alternatively, method 800 may return to operation 802 to provide an iterative loop of receiving a stream of input images, applying a digital effect to the stream of input images, and determining if the input video stream, with the applied digital effect, exhibits geometric distortion.

If however, it is determined that the input video stream, with the applied digital effect, does exhibit geometric distortion, flow instead branches "YES" to operation 810, where, an analytical projection type, from a plurality of analytical projection types, is selected (e.g., automatically, via systems described herein) that maps pixels of the input stream of images to projected pixels of a modified stream of images. The plurality of analytical projection types may include a rectilinearly symmetric projection, and/or another suitable projection type. Additionally, and/or alternatively, the plurality of analytical projection types may include a plurality of discrete meshes that are each configured to correct, to varying degrees, geometric distortion within the stream of input images. It should be recognized by those of ordinary skill in the art that different meshes may be configured to correct different types of geometric distortion (e.g., distortion occurring at different locations within the stream of input images and/or different degrees to which the stream of input images is exhibiting distortion).

The analytical projection may comprise a direct analytical projection, such as rectilinear, cylindrical, or spherical projection. Additionally, or alternatively, the analytical projection may comprise indirect analytical projections such as non-radial distortion correction ZoomRect-SG or radial distortion correction SoftRect.

The lens associated with capturing the stream of input images may have a lens distortion. Accordingly, the analytical projection type may be based, at least in part, on the lens distortion. Additionally, or alternatively, the lens distortion may be based at least in part on the digital effect that is applied to the stream of input images. For example, based on manufacturing characteristics of a lens through which an image is received, and certain digital effects (e.g., of pan, tilt, and/or zoom) may generate corresponding geometric distortion that can be corrected (fully or partially) using mechanisms described herein, to generate life-like images (e.g., images that do not exhibit geometric distortion, or exhibit less geometric distortion than would otherwise be apparent, without mechanisms disclosed herein being applied).

At operation 812, the analytical projection type is applied to the stream of input images, to generate the modified stream of images. Additionally, or alternatively, at operation 812, the modified stream of images may be generated, using the selected analytical projection type. By applying the analytical projection type to the stream of input images and/or otherwise using the selected analytical projection type, a geometric distortion within the stream of input images is corrected, while the digital effect is applied. For example, in some examples, a digital effect may be applied to one or more images frames that form a stream of images, thereby exaggerating a geometric distortion within the image frames. Accordingly, applying the analytical projection type, to the image frames that have the digital effect applied will correct a geometric distortion within the image frames.

In some examples, on-axis $X_0$, $Y_0$, $Z_0$-based grid arrays are determined, without angle compensations, which represent XYZ coordinates to analytical projection surfaces with respect to camera optical axis. A distances $Z_p$ may be set to represent a distance from a field of view (FOV) origin of the selected analytical projection (e.g., of operation 810) to an analytical projection surface.

The digital effect discussed herein may be applied using the $Z_p$ distance, such that the $X_0$, $Y_0$, $Z_0$-based array values may be rotated about the field of view origin into positions corresponding to pan and/or tilt angles of desired camera pointing views (e.g., views of each of the modified images 604-616 and/or the modified images 704-716).

The $X_0$, $Y_0$, $Z_0$-based array values may be rotated about the field of view origin by rotating analytical projection surface coordinates in a $Y_0Z_0$ plane (e.g., a plane on which the $Y_0$ and the $Z_0$ values are disposed) by an elevation angle ($\varphi$) corresponding to a target virtual optical axis. The rotation in the $Y_0Z_0$ plane may be defined by Equations 1 and 2 below.

$$(Y_{yz}) = Y_0 \cos\left(\left(\frac{\pi}{180}\right)\varphi\right) - Z_0 \sin\left(\left(\frac{\pi}{180}\right)\varphi\right). \quad 1$$

$$(Z_{yz}) = Y_0 \sin\left(\left(\frac{\pi}{180}\right)\varphi\right) + Z_0 \cos\left(\left(\frac{\pi}{180}\right)\varphi\right). \quad 2$$

The $X_0$, $Y_0$, $Z_0$ coordinate axes may then be rotated into room or scene XYZ coordinate axes that form XYZ-based coordinated of the analytical projection surface, to compensate for camera pitch angles ($\varphi_{cam}$) in a YZ plane. The rotation may be defined by Equations 3 and 4 below.

$$(Y'_{yz}) = Y_{yz}\cos\left(\left(\frac{\pi}{180}\right)\varphi_{cam}\right) + Z_{yz}\sin\left(\left(\frac{\pi}{180}\right)\varphi_{cam}\right). \quad 3$$

$$(Z'_{yz}) = -Y_{yz}\sin\left(\left(\frac{\pi}{180}\right)\varphi_{cam}\right) + Z_{yz}\cos\left(\left(\frac{\pi}{180}\right)\varphi_{cam}\right). \quad 4$$

An azimuth rotation ($\Theta$) of a target virtual optical axis in an XZ plane may then be performed, using Equations 5 and 6 below.

$$(X'_0) = X_0\cos\left(\left(\frac{\pi}{180}\right)\theta\right) - Z'_{yz}\sin\left(\left(\frac{\pi}{180}\right)\theta\right). \quad 5$$

$$(Z_{yz\_xz}) = X_0\sin\left(\left(\frac{\pi}{180}\right)\theta\right) + Z'_{yz}\cos\left(\left(\frac{\pi}{180}\right)\theta\right). \quad 6$$

The coordinate axes may then be rotated back into a camera optical axis $X_0$, $Y_0$, $Z_0$-based coordinates, using equations 7 and 8 below.

$$(Y'_0) = Y'_{yz}\cos\left(-\left(\frac{\pi}{180}\right)\varphi_{cam}\right) + Z_{yz\_xz}\sin\left(-\left(\frac{\pi}{180}\right)\varphi_{cam}\right). \quad 7$$

$$(Z'_0) = -Y'_{yz}\sin\left(-\left(\frac{\pi}{180}\right)\varphi_{cam}\right) + Z_{yz\_xz}\cos\left(-\left(\frac{\pi}{180}\right)\varphi_{cam}\right). \quad 8$$

Since $X_0'$, $Y_0'$, and $Z_0'$ coordinates of the analytical projection surface were calculated from analytical rotations, and represent mapped positions relative to the optical axis (e.g., physical optical axis) of a camera's lens, the coordinates in these arrays may be used to determine field angles $\Phi$ for all pixels, as well as clocking, relative to a sensor orientation for distortion correction meshes $X_c$ and $Y_c$. Equation 9, below, may be used to determine field angles $\Phi$ in arrays for all pixels representing dewarp frames.

$$(\Phi) = \left(\frac{\pi}{180}\right)\sin^{-1}\left(\sqrt{\frac{(X_0'^2 + Y_0'^2)}{(X_0'^2 + Y_0'^2 + Z_0'^2)}}\right). \quad 9$$

The $X_c$ and $Y_c$ mesh arrays containing, respectively, x and y pixel positions which map to corresponding pixels in one or from frames of the received stream of input images (e.g., from operation 802) may be defined using Equations 10 and 11, below. The f is the focal length of a lens, array D represents distorted field angles corresponding to an ideal field angle map ($\Phi$), as defined by the choice of dewarp type (e.g., selected analytical projection from operation 810), and clock angle correction factor is expressed in terms of $X_0'$ and $Y_0'$ with respect to an image sensor orientation.

$$(X_c) = fD\left(\frac{X_0'}{\sqrt{(X_0'^2 + Y_0'^2)}}\right). \quad 10$$

$$(Y_c) = fD\left(\frac{Y_0'}{\sqrt{(X_0'^2 + Y_0'^2)}}\right). \quad 11$$

After the digital effect is applied using one or more of Equations 1-9 above, then distortion correction may be performed by interpolation of $X_0'$ $Y_0'$ positions pointing to input image pixel content. In the case of setting $z_p$ to represent a distance to a FOV origin, a virtual optical axis, thus virtual camera pointing angle, remains at the center of a frame.

In some examples, limits may be placed on parameters of pan angle $\theta$, tilt angle $\varphi$, and horizontal field of view (HFOV) for zoom to avoid not a number error (e.g., NaNs), or nulls in the frame, so as to avoid pointing to pixel positions outside of a received image area extent.

In some examples, the rotation steps discussed herein (e.g., with respect to the digital effect) are not limited by the example process listed above. In some cases, the relative orientation of a camera optical axis to a targeted scene geometry may be more involved than elevation or pitch angle compensation alone. In such case, additional rotations of the analytical projection surface data and/or additional rotations of coordinate axes may be performed to achieve the desired pan, tilt and zoom correction. Further, compensation input parameters such as camera pitch angle, may be generated by a number of means, including mechanical knowledge of the setup geometry, or use of an onboard Inertial Measurement Unit (IMU) which may provide gravity vector measured data, or some machine learned method based on image content within a captured frame. Further, tilt compensation of the camera pointing angle may be omitted, such that the corrections are applied with respect to the lens optical axis.

Further, alternative rotation steps may be made to achieve effectively the same resulting correction as examples provided herein. For example, the two coordinate breaks encompassed by Equations 9, 10, and 11 could be left out, and an in-frame rotation derived from the compound angle β (see FIG. 9) could be performed to correct for this compound angular error on frame content. However, in some examples, such rotation derivation may not be as efficient or practical as the case of making use of coordinate breaks such as the two axes rotations used in Equations 9, 10, and 11 described above.

Further still, the rotations of xyz positions of the analytical projection surface as well as any rotations of coordinate axes may be made through use of matrix operations and/or linear algebra, as appropriate, and thus are not limited to the example equations described earlier herein.

If a camera tile angle is set to 0, the correction steps may be the same as indicated, since a tilt angle of 0 has no impact on rotation. Alternatively, since the coordinate breaks (rotation of axes) would not be necessary, these steps may be skipped or omitted, in such case. However, when camera pitch angle is intended to be compensated, the steps may be left in place for consistency of usage for various Pan, tilt, and Zoom parameters.

Generally, the digital effect discussed herein includes a plurality of analytical functions, for example, as described above, that are applied to a grid that maps $(x_0, y_0, z_0)$ to $(x_0', y_0', z_0')$. The $(x_0, y_0, z_0)$ is a pixel position in the stream of input images, and the $(x_0', y_0', z_0')$ is a pixel position in the modified stream of images (e.g., a stream of images to which a digital effect has been applied). The plurality of analytical functions may further be based on a first angle ($\varphi$) and a second angle ($\theta$). The first and second angles each correspond to the digital effect on which the modified stream of images is based. Further, the first and second angles may be non-zero angles.

Equations 1-11 above may create and direct a virtual optical axis of a lens (e.g., as opposed to a physical optical axis of a lens), via pan and tilt angles, such that digital effects can be analytically applied to the stream of input images. Distortion correction may then be performed on the stream of input images, using the analytical projection type (e.g., mesh that is mapped to pixels), with the applied digital effect, thereby generating a modified stream of images that can be output and/or displayed.

At operation 814, the modified stream of images is output. The modified stream of images may be output to a device such as a computer, an external display, or a smartphone. Alternatively, the modified stream of images may be output to local memory, or to memory that is remote from a device at which one or more of the above operations were performed, such that further processing on the modified stream of images may be performed.

At operation 816, the modified stream of images is displayed. The modified stream of images may be displayed, for example, on a display screen of a computing device, such as computing device 102 described earlier herein with respect to FIG. 1. Additionally, or alternatively, the modified stream of images may be otherwise displayed using components that may be local to a device at which one or more of the above operations were performed, or remote from a device at which one or more of the above operations were performed.

In some examples, the digital effect of operation 804 is a first digital effect, the analytical projection of operation 810 is a first analytical projection, and method 800 can further include that a second digital effect is applied. The second digital effect may be applied to the modified stream of images. Alternatively, the second digital effect may be applied to the stream of input images. A second analytical projection type, from the plurality of analytical projection types, discussed above, can be selected (e.g., in real-time), based on the second digital affect. Accordingly, the modified stream of images may be updated, based on the second analytical projection type. The modified stream of images may then be output and/or displayed.

Generally, it should be appreciated by those of ordinary skill in the art that different digital effects may generate different types or degrees of geometric distortion within a stream of input images to which the digital effect is applied. Accordingly, based on distortion within a lens, or image sensor, and an applied digital effect, different types of analytical projection types may most effectively reduce geometric distortion within the stream of input images.

Method 800 may terminate at operation 816. Alternatively, method 800 may return to operation 802 (or any other operation from method 800) to provide an iterative loop, such as of receiving a stream of input images, applying a digital effect to the stream of input images, determining an analytical projection type, and applying the analytical projection type, thereby correcting a geometric distortion within the stream of input images, while applying the digital effect.

Figure 9:
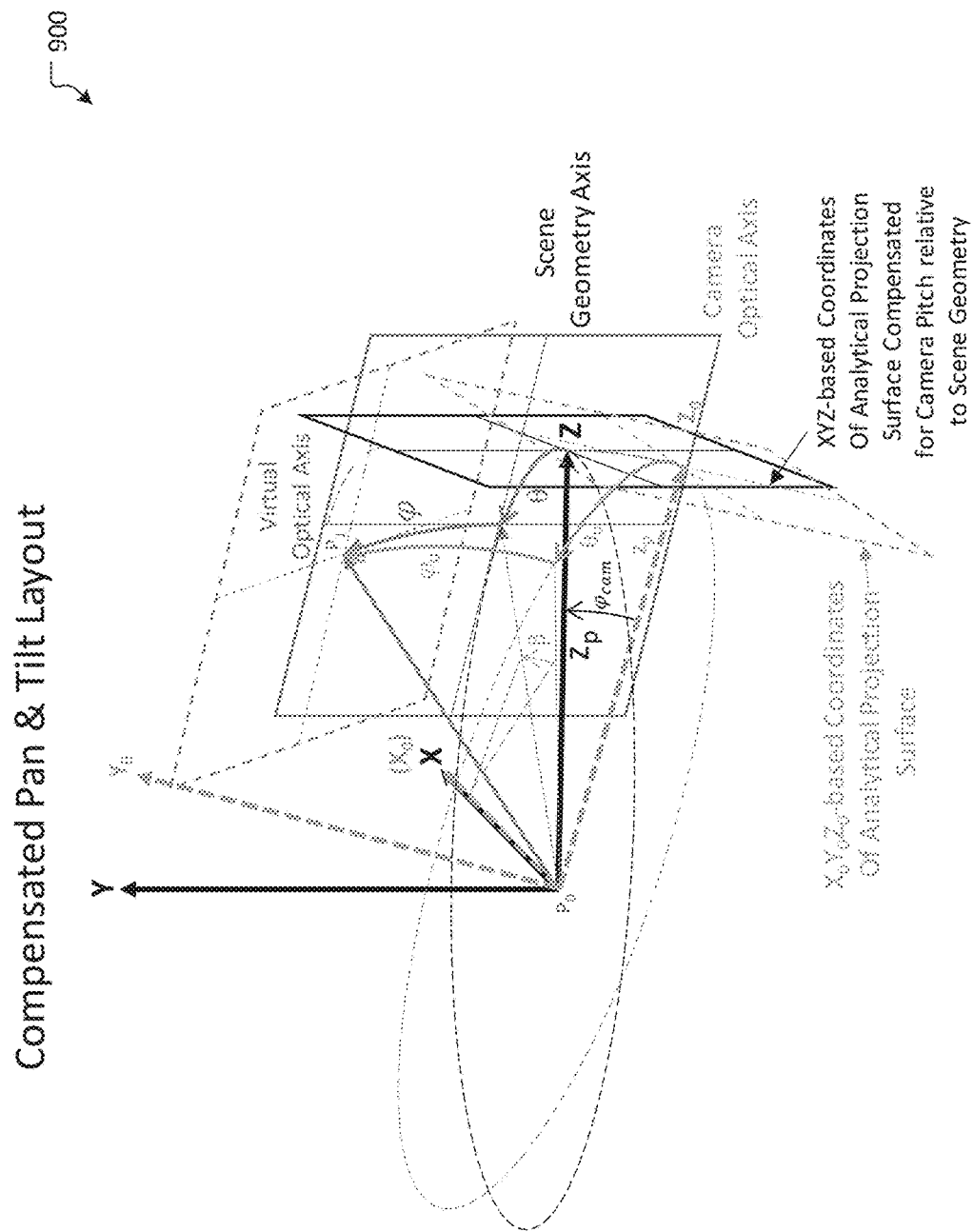
FIG. 9 illustrates an example pan and tilt layout according to some aspects described herein.

FIG. 9 illustrate an example pan and tilt layout 900 according to some aspects provided herein. The example pan and tilt layout 900 illustrates how a camera optical axis may be rotated to a virtual optical axis, such as is described in further detail, above, with respect to the method 800. Since, the layout 900 is an example illustration in accordance with aspects of method 800, and specifically, discussion relating to Equations 1-11, elements with common labels between the description of method 800 and the illustration of layout 900 may be similar, such as, for example, $X_o$, $Y_o$, $Z_o$, $Z_p$, $\varphi$, $\varphi_{cam}$, $\theta$, $\beta$.

Figure 10:
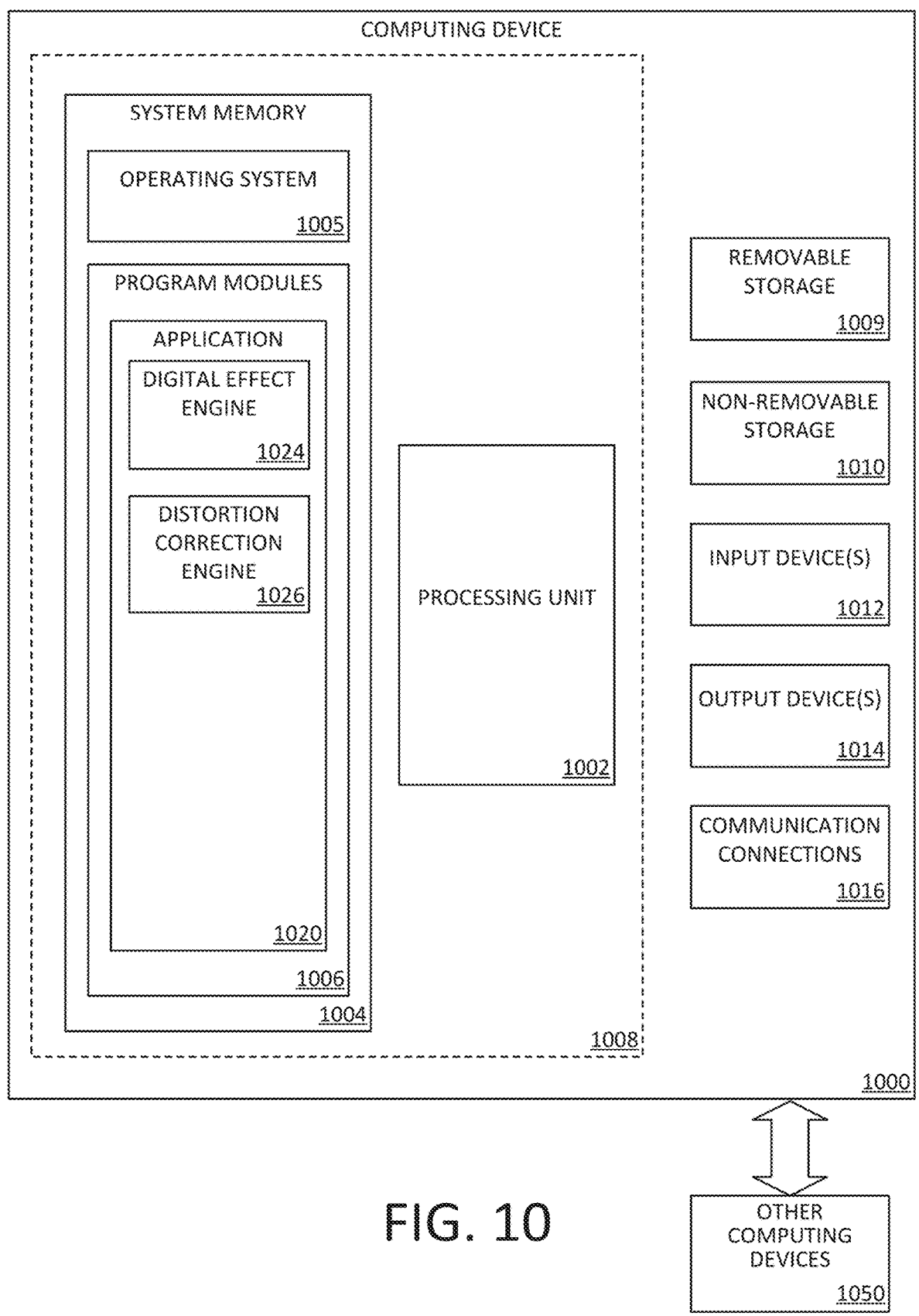
FIG. 10 illustrates a block diagram illustrating example physical components of a computing device with which aspects of the disclosure may be practiced.
Figure 11A:
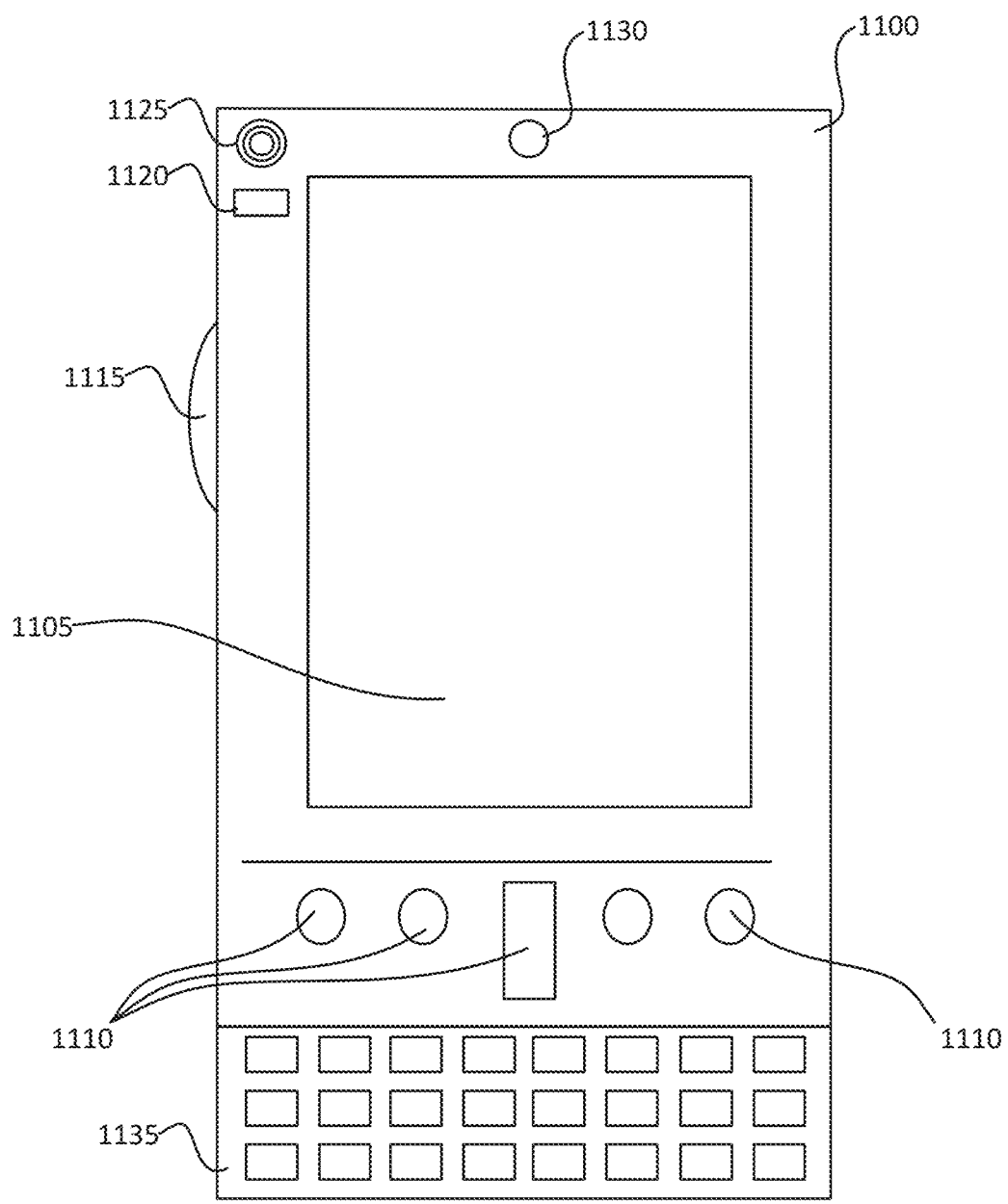
FIGS. 11A and 11B are simplified block diagrams of a mobile computing device with which aspects of the present disclosure may be practiced.
Figure 11B:
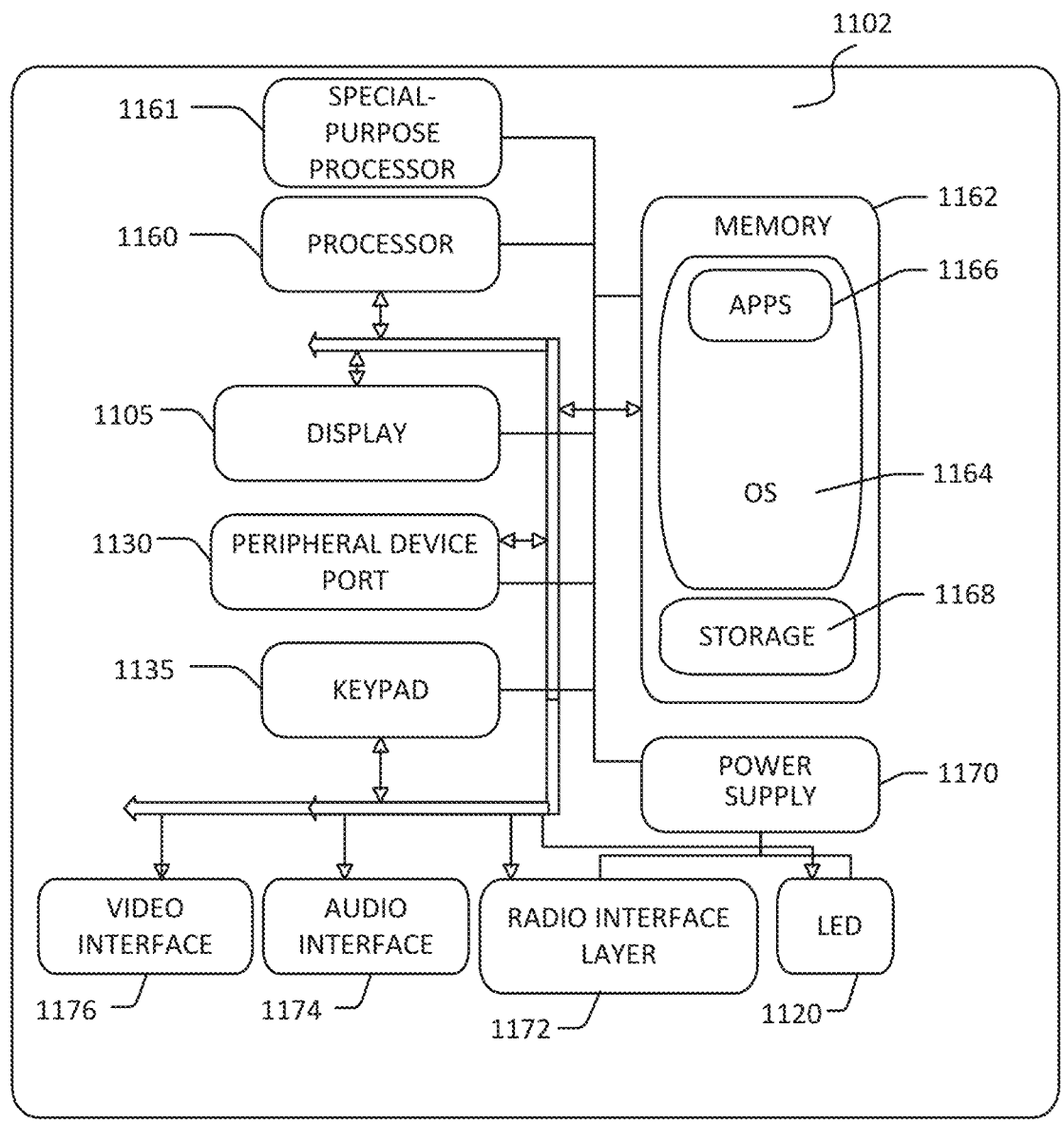
Figure 12:
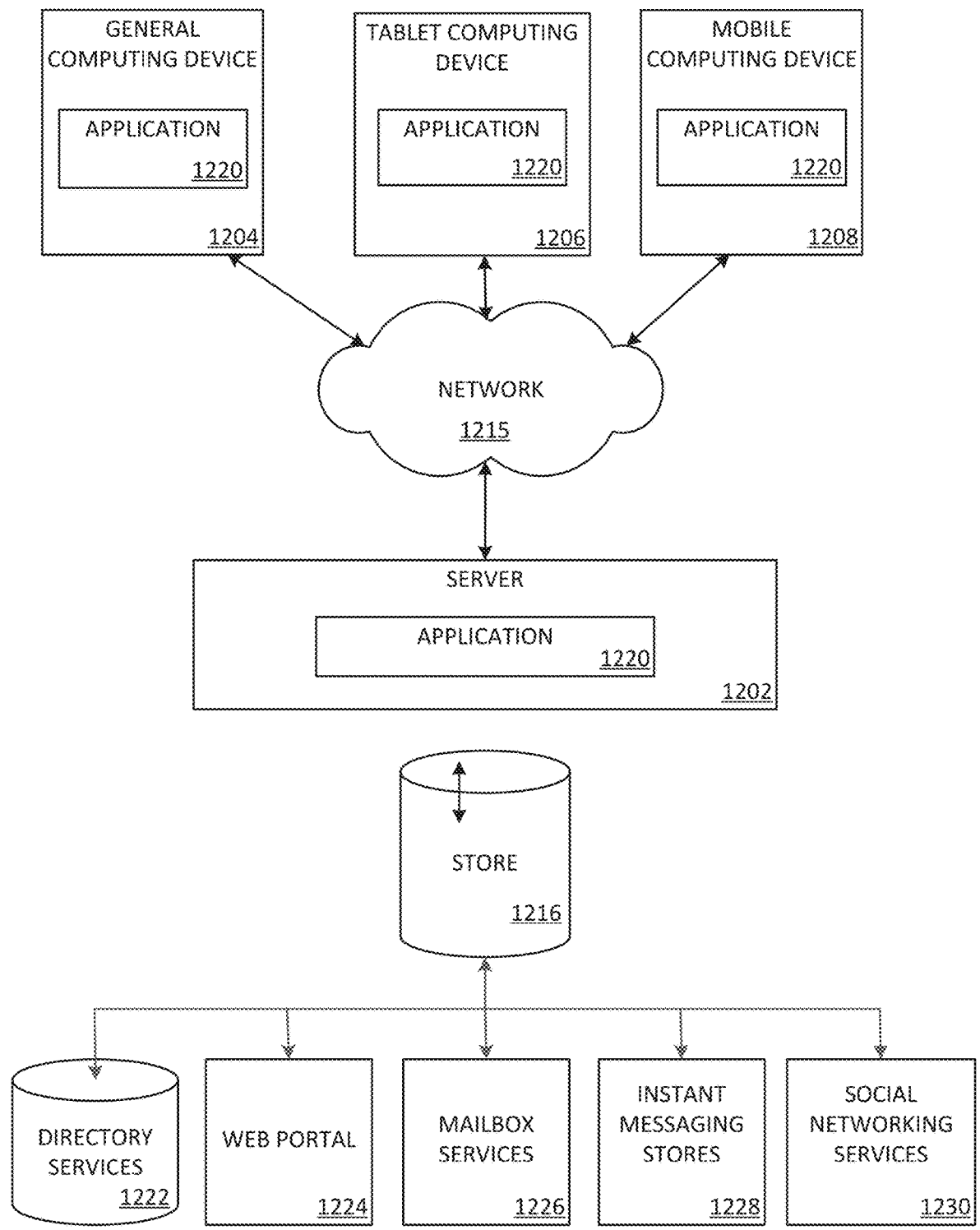
FIG. 12 is a simplified block diagram of a distributed computing system in which aspects of the present disclosure may be practiced.

FIGS. 10-12 and the associated descriptions provide a discussion of a variety of operating environments in which aspects of the disclosure may be practiced. However, the devices and systems illustrated and discussed with respect to FIGS. 10-12 are for purposes of example and illustration and are not limiting of a vast number of computing device configurations that may be utilized for practicing aspects of the disclosure, described herein.

FIG. 10 is a block diagram illustrating physical components (e.g., hardware) of a computing device 1000 with which aspects of the disclosure may be practiced. The computing device components described below may be suitable for the computing devices described above, including computing device 102 in FIG. 1. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as one or more components supported by the systems described herein. As examples, system memory 1004 may store digital effect engine or component 1024 and/or distortion correction engine or component 1026. The operating system 1005, for example, may be suitable for controlling the operation of the computing device 1000.

Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 11A and 11B illustrate a mobile computing device 1100, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The one or more input buttons 1110 may be "soft" buttons that are generated on the touch screen display. The display 1105 of the mobile computing device 1100 may also function as an input device (e.g., a touch screen display).

If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some examples.

In yet another alternative example, the mobile computing device 1100 is a portable phone system, such as a cellular phone. The mobile computing device 1100 may also include an optional keypad 1135. Optional keypad 1135 may be a physical keypad or a "soft" keypad generated on the touch screen display.

In various examples, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In some examples, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., a digital effect engine, a distortion correction engine, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated example, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and/or special-purpose processor 1161 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1224, a web portal 1225, a mailbox service 1226, an instant messaging store 1228, or a social networking site 1230.

An application 1220 (e.g., similar to the application 1020) may be employed by a client that communicates with server device 1202. Additionally, or alternatively, one or more aspects of the application 1220 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these examples of the computing devices may obtain content from the store 1216, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for processing a stream of input images, the method comprising:
   receiving, from a camera, a stream of input images at a first computing device during a videoconference with a remote second computing device;
   selecting an analytical projection type, from a plurality of analytical projection types, that maps pixels of the input stream of images to projected pixels of a modified stream of images;
   generating the modified stream of images, using the selected analytical projection type, thereby correcting a geometric distortion within the stream of input images;
   applying, to the modified stream of images, a digital effect comprising a change to an elevation angle of the camera relative to a scene geometry, thereby generating an output stream of images that simulates an elevation for the camera; and
   causing the output stream of images to be displayed on the first computing device and the same output stream of images to be displayed on the remote second computing device during the videoconference.

2. The method of claim 1, wherein the digital effect is a first digital effect, wherein the analytical projection type is a first analytical projection type, and wherein the method further comprises:
   applying a second digital effect;
   selecting a second analytical projection type, from the plurality of analytical projection types, in real-time, based on the second digital effect; and
   updating the displayed modified stream of images, based on the second analytical projection type.

3. The method of claim 1, wherein the second digital effect is applied to the modified stream of images.

4. The method of claim 3, wherein the stream of input images is received from an image sensor, and wherein a lens associated with the image sensor has a horizontal field of view greater than 120 degrees.

5. The method of claim 4, wherein the lens associated with capturing the stream of input images has a lens distortion, and wherein the analytical projection type is based, at least in part, on the lens distortion.

6. The method of claim 1, wherein the plurality of analytical projection types comprises a rectilinearly symmetric projection.

7. The method of claim 1, wherein the plurality of analytical projection types comprise a plurality of discrete meshes, each of the plurality of discrete meshes being configured to correct, to varying degrees, the geometric distortion within the stream of input images.

8. The method of claim 1, wherein applying the digital effect comprises applying a plurality of analytical functions to a grid that maps $(x_0, y_0, z_0)$ to $(x_0', y_0', z_0')$, wherein $(x_0, y_0, z_0)$ corresponds to a pixel position in the stream of input images, and $(x_0', y_0', z_0')$ corresponds to a pixel position in the modified stream of images.

9. The method of claim 8, wherein the plurality of analytical functions are based on a first angle ($\varphi$), a second angle ($\Theta$), and a third angle ($\varphi_{cam}$), the first, second, and third angles each corresponding to the digital effect on which the modified stream of images is based.

10. The method of claim 9, wherein the plurality of analytical functions comprises:

$$(Y_{yz}) = Y_0 \cos\left(\left(\frac{\pi}{180}\right)\varphi\right) - Z_0 \sin\left(\left(\frac{\pi}{180}\right)\varphi\right);$$

$$(Z_{yz}) = Y_0 \sin\left(\left(\frac{\pi}{180}\right)\varphi\right) + Z_0 \cos\left(\left(\frac{\pi}{180}\right)\varphi\right);$$

$$(Y'_{yz}) = Y_{yz}\cos\left(\left(\frac{\pi}{180}\right)\varphi_{cam}\right) + Z_{yz}\sin\left(\left(\frac{\pi}{180}\right)\varphi_{cam}\right);$$

$$(Z'_{yz}) = -Y_{yz}\sin\left(\left(\frac{\pi}{180}\right)\varphi_{cam}\right) + Z_{yz}\cos\left(\left(\frac{\pi}{180}\right)\varphi_{cam}\right);$$

$$(X'_0) = X_0\cos\left(\left(\frac{\pi}{180}\right)\theta\right) - Z'_{yz}\sin\left(\left(\frac{\pi}{180}\right)\theta\right);$$

$$(Z_{yz\_xz}) = X_0\sin\left(\left(\frac{\pi}{180}\right)\theta\right) + Z'_{yz}\cos\left(\left(\frac{\pi}{180}\right)\theta\right);$$

$$(Y'_0) = Y'_{yz}\cos\left(-\left(\frac{\pi}{180}\right)\varphi_{cam}\right) + Z_{yz_{xz}}\sin\left(-\left(\frac{\pi}{180}\right)\varphi_{cam}\right); \text{ and}$$

$$(Z'_0) = -Y'_{yz}\sin\left(-\left(\frac{\pi}{180}\right)\varphi_{cam}\right) + Z_{yz\_xz}\cos\left(-\left(\frac{\pi}{180}\right)\varphi_{cam}\right).$$

11. The method of claim 10, wherein o and O are each non-zero angles.

12. A system for processing a stream of input images, the system comprising:
   an image sensor;
   a lens associated with the image sensor, the lens having a lens distortion;
   a display screen associated with the image sensor;
   at least one processor; and
   memory storing instructions that, when executed by the at least one processor, cause the system to perform a set of operation, the set of operations comprising:
      obtaining, from the image sensor, a stream of input images during a videoconference with a remote second computing device;
      selecting an analytical projection type that maps pixels of the input stream of images to projected pixels of a modified stream of images, the analytical projection type being based, at least in part, on the lens distortion;
      applying the analytical projection type to the stream of input images, to generate the modified stream of images, thereby correcting a geometric distortion within the stream of input images;
      applying, to the modified stream of images, a digital effect comprising a change to an elevation angle of the image sensor relative to a scene geometry, thereby generating an output stream of images that simulates an elevation for the image sensor; and
      causing the output stream of images to be displayed on the display screen and the same output stream of images to be separately displayed on the remote second computing device during the videoconference.

13. The system of claim 12, wherein the digital effect is a first digital effect, wherein the analytical projection type is a first analytical projection type, and wherein the set of operations further comprises:
   applying a second digital effect;
   selecting a second analytical projection type, from the plurality of analytical projection types, in real-time, based on the second digital effect; and updating the modified stream of images, based on the second analytical projection type.

14. The system of claim 12, wherein the second digital effect is applied to the stream of input images.

15. The system of claim 12, wherein the lens associated with the image sensor has a horizontal field of view greater than 120 degrees.

16. The system of claim 12, wherein the digital effect includes one or more from the group of: a pan, a tilt, or a zoom, of the stream of input images.

17. The system of claim 12, wherein the plurality of analytical projection types comprise a plurality of discrete meshes, each of the plurality of discrete meshes being configured to correct, to varying degrees, the geometric distortion within the stream of input images.

18. The system of claim 12, wherein applying the digital effect comprises applying a plurality of analytical functions to a grid that maps $(x_0, y_0, z_0)$ to $(x_0', y_0', z_0')$, wherein $(x_0, y_0, z_0)$ corresponds to a pixel position in the stream of input images, and $(x_0', y_0', z_0')$ corresponds to a pixel position in the modified stream of images, and wherein the plurality of analytical functions are based on a first angle ($\varphi$), a second angle ($\Theta$), and a third angle ($\varphi_{cam}$), the first, second, and third angles each corresponding to the digital effect on which the modified stream of images is based.

19. The system of claim 18, wherein the plurality of analytical functions comprises:

$$(Y_{yz}) = Y_0 \cos\left(\left(\frac{\pi}{180}\right)\varphi\right) - Z_0 \sin\left(\left(\frac{\pi}{180}\right)\varphi\right);$$

$$(Z_{yz}) = Y_0 \sin\left(\left(\frac{\pi}{180}\right)\varphi\right) + Z_0 \cos\left(\left(\frac{\pi}{180}\right)\varphi\right);$$

$$(Y_{yz}') = Y_{yz} \cos\left(\left(\frac{\pi}{180}\right)\varphi_{cam}\right) + Z_{yz} \sin\left(\left(\frac{\pi}{180}\right)\varphi_{cam}\right);$$

$$(Z_{yz}') = -Y_{yz} \sin\left(\left(\frac{\pi}{180}\right)\varphi_{cam}\right) + Z_{yz} \cos\left(\left(\frac{\pi}{180}\right)\varphi_{cam}\right);$$

$$(X_0') = X_0 \cos\left(\left(\frac{\pi}{180}\right)\theta\right) - Z_{yz}' \sin\left(\left(\frac{\pi}{180}\right)\theta\right);$$

$$(Z_{yz\_xz}) = X_0 \sin\left(\left(\frac{\pi}{180}\right)\theta\right) + Z_{yz}' \cos\left(\left(\frac{\pi}{180}\right)\theta\right);$$

$$(Y_0') = Y_{yz}' \cos\left(-\left(\frac{\pi}{180}\right)\varphi_{cam}\right) + Z_{yz_{xz}} \sin\left(-\left(\frac{\pi}{180}\right)\varphi_{cam}\right); \text{ and}$$

$$(Z_0') = -Y_{yz}' \sin\left(-\left(\frac{\pi}{180}\right)\varphi_{cam}\right) + Z_{yz\_xz} \cos\left(-\left(\frac{\pi}{180}\right)\varphi_{cam}\right).$$

20. A method for processing a stream of input images, the method comprising:
  receiving, from a camera, a stream of input images at a first computing device during a video conference with a remote second computing device;
  selecting an analytical projection type, from a plurality of analytical projection types, that maps pixels of the input stream of images to projected pixels of a modified stream of images;
  applying the analytical projection type to the stream of input images, to generate the modified stream of images, thereby correcting a geometric distortion within the stream of input images, in the modified stream of images;
  applying, to the modified stream of images, a digital effect comprising a change to an elevation angle of the camera relative to a scene geometry, thereby generating an output stream of images that simulates an elevation for the camera; and
  causing the modified stream of images to be displayed on the remote second computing device during the videoconference.

* * * * *